(12) United States Patent
Takaishi

(10) Patent No.: US 7,515,375 B2
(45) Date of Patent: Apr. 7, 2009

(54) POSITIONING CONTROL DEVICE AND DISK DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 249 days.

(21) Appl. No.: 11/475,748

(22) Filed: Jun. 27, 2006

(65) Prior Publication Data

US 2007/0211372 A1 Sep. 13, 2007

(30) Foreign Application Priority Data

Mar. 7, 2006 (JP) ............... 2006-060507

(51) Int. Cl.
*G11B 5/596* (2006.01)

(52) U.S. Cl. ............... 360/78.07; 360/78.04; 360/77.08

(58) Field of Classification Search ........................ None
See application file for complete search history.

(56) References Cited

U.S. PATENT DOCUMENTS

| | | |
|---|---|---|
| 5,721,648 A | 2/1998 | Phan et al. |
| 6,496,315 B1 | 12/2002 | Ueda et al. |
| 2002/0089779 A1 | 7/2002 | Heydt et al. |
| 2002/0126412 A1* | 9/2002 | Shibata ............ 360/77.04 |

FOREIGN PATENT DOCUMENTS

| | | |
|---|---|---|
| EP | 1 739 514 | 1/2007 |
| JP | 05-062393 | 3/1993 |
| JP | 09-259555 | 10/1997 |
| JP | 10-074371 | 3/1998 |
| JP | 2000-040318 | 2/2000 |
| JP | 2000-163872 | 6/2000 |
| JP | 2001-283544 | 10/2001 |
| WO | WO 01/80242 | 10/2001 |

* cited by examiner

*Primary Examiner*—Andrew L Sniezek
(74) *Attorney, Agent, or Firm*—Greer, Burns & Crain, Ltd.

(57) ABSTRACT

The present invention provides a positioning control device and a disk device for shortening a calculation delay time. Upon detection of a position signal from a demodulation circuit, an MCU of the disk device calculates a position error, and following calculation of a control amount, executes determination and correction processing. A variable value prior to the start of calculation is stored in a save area of a memory (or a save memory) such that when the variable value is to be reset as a result of the determination and correction processing, the variable value is read from the save area, the reset variable value is stored in an overwrite area of the memory (or an overwrite memory), and calculation of the control amount is re-executed.

14 Claims, 18 Drawing Sheets

MAGNETIC DISK DEVICE 1

POSITION SIGNAL

CALCULATION PROCESSING

CONTROL CALCULATION POST-PROCESSING

DETERMINATION AND CORRECTION PROCESSING

CONTROL AMOUNT CALCULATION

POSITION ERROR CALCULATION

EXAMPLE OF CALCULATION PROCESSING PROCEDURE

MAGNETIC DISK DEVICE 1

FIG. 10A POSITION SIGNAL
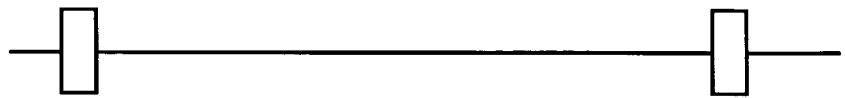

FIG. 10B CALCULATION DEVICE A
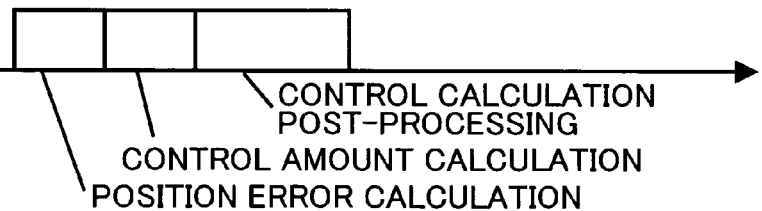
CONTROL CALCULATION POST-PROCESSING
CONTROL AMOUNT CALCULATION
POSITION ERROR CALCULATION

FIG. 10C CALCULATION DEVICE B
DETERMINATION AND CORRECTION PROCESSING

EXAMPLE OF CALCULATION PROCESSING PROCEDURE USING TWO CALCULATION DEVICES

FIG. 10D POSITION SIGNAL
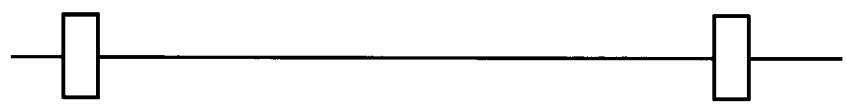

FIG. 10E CALCULATION DEVICE A
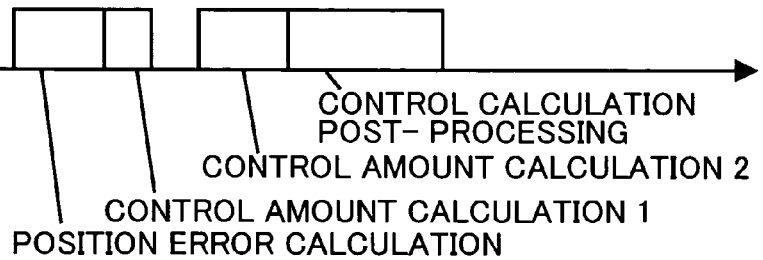
CONTROL CALCULATION POST- PROCESSING
CONTROL AMOUNT CALCULATION 2
CONTROL AMOUNT CALCULATION 1
POSITION ERROR CALCULATION

FIG. 10F CALCULATION DEVICE B
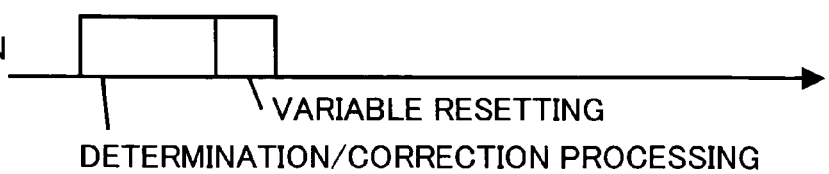
VARIABLE RESETTING
DETERMINATION/CORRECTION PROCESSING

EXAMPLE OF CALCULATION PROCESSING PROCEDURE USING TWO CALCULATION DEVICES

POSITION SIGNAL

CALCULATION DEVICE A

CONTROL CALCULATION POST-PROCESSING
CONTROL AMOUNT CALCULATION 2
VARIABLE RESETTING
CONTROL AMOUNT CALCULATION 1
POSITION ERROR CALCULATION

CALCULATION DEVICE B

DETERMINATION AND CORRECTION PROCESSING

EXAMPLE OF CALCULATION PROCESSING PROCEDURE USING TWO CALCULATION DEVICES

FIG. 13
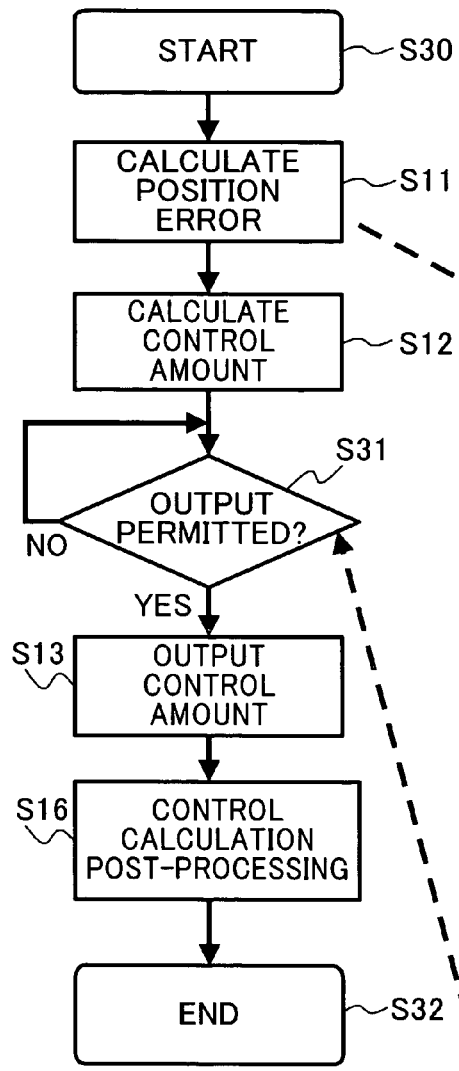
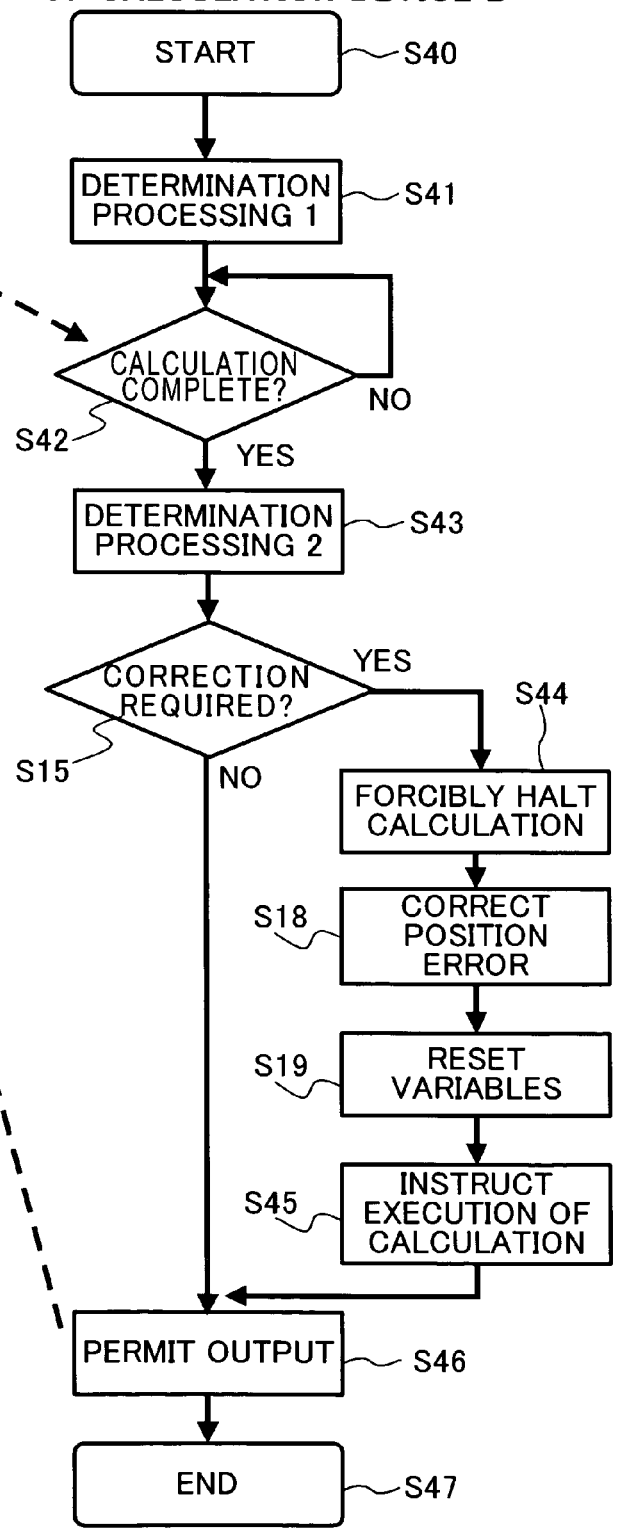

FIG. 14
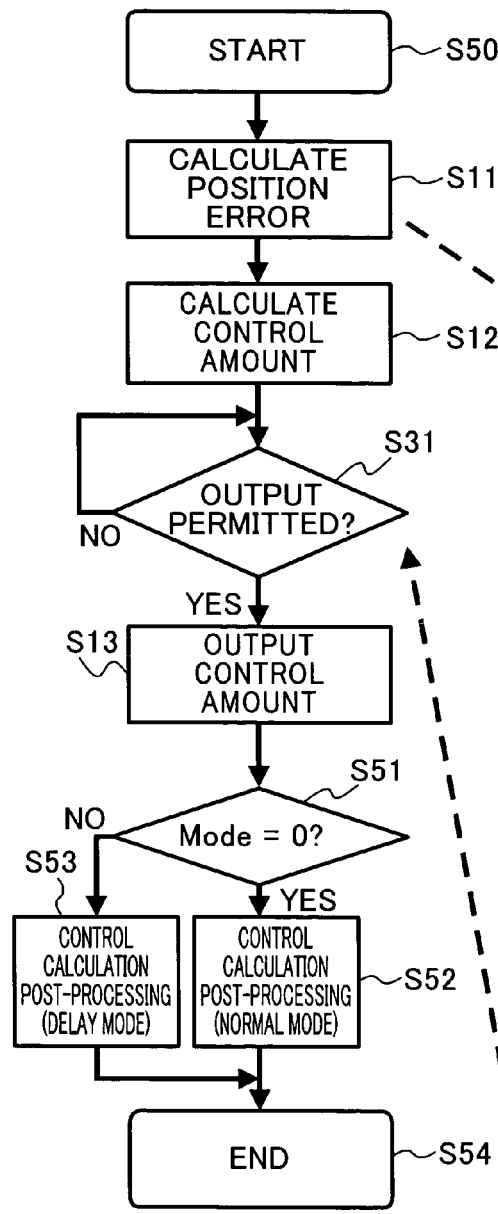
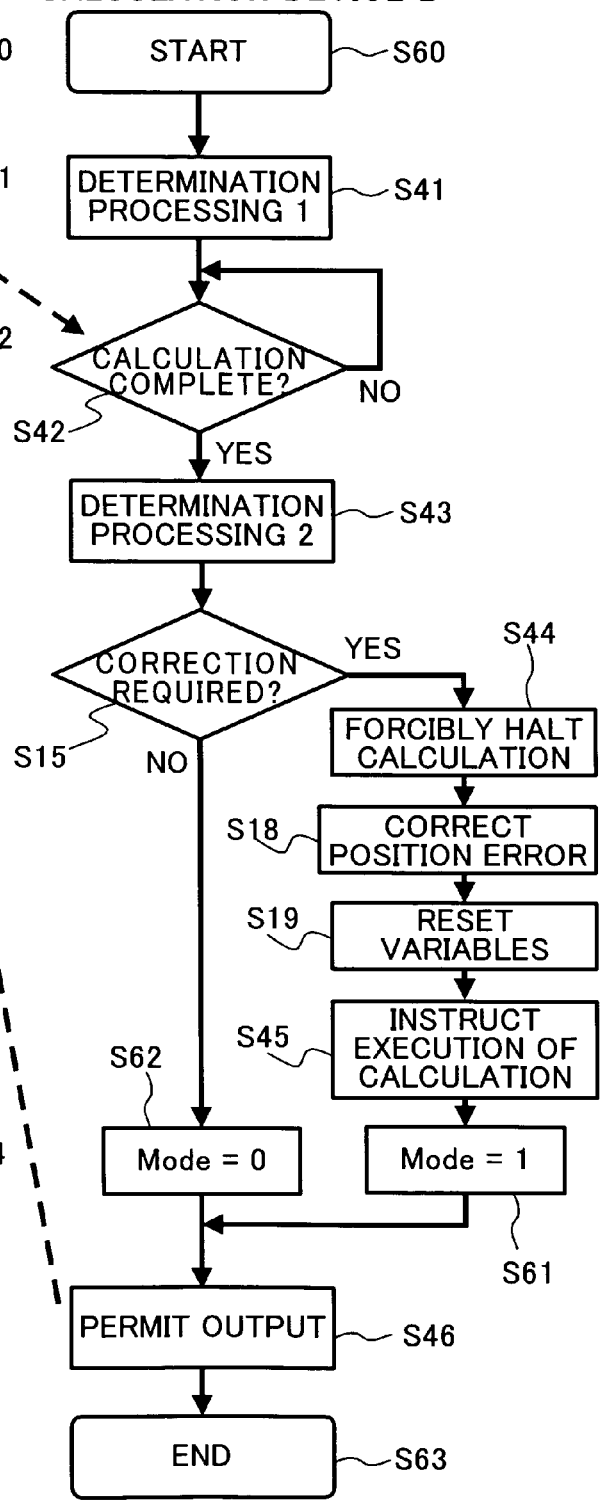

FIG. 16
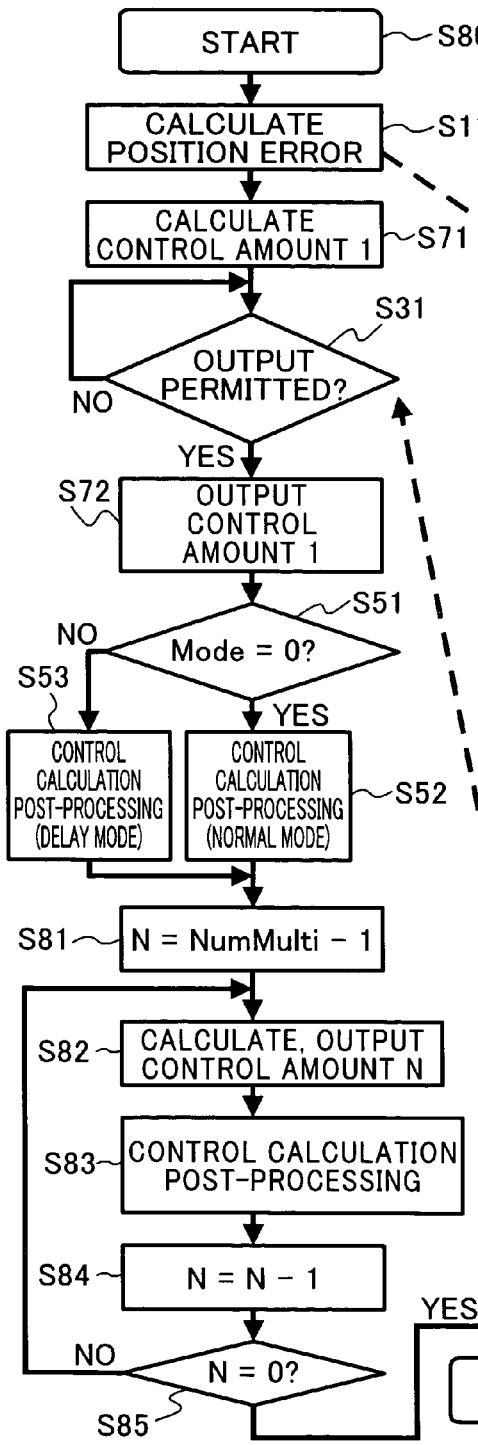
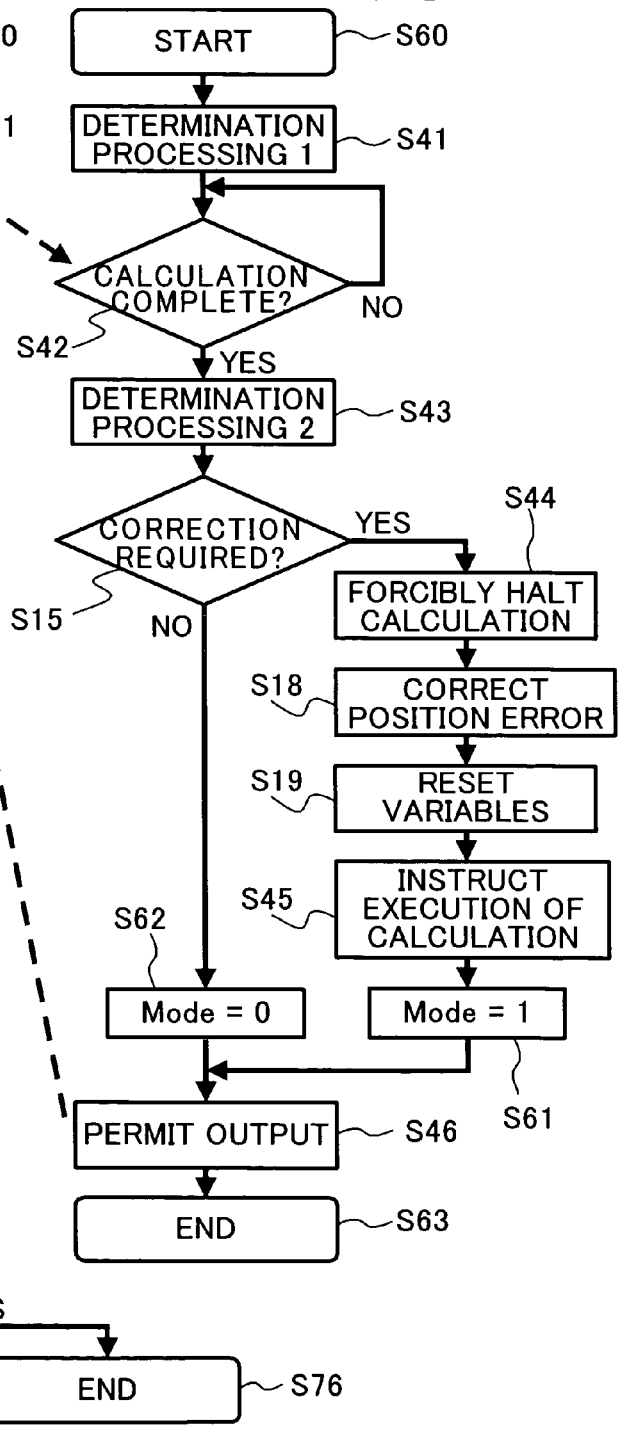

POSITION SIGNAL

CALCULATION PROCESSING

CONTROL CALCULATION POST-PROCESSING

CONTROL AMOUNT CALCULATION

DETERMINATION AND CORRECTION PROCESSING

CALCULATE POSITION ERROR

EXAMPLE OF CONVENTIONAL CALCULATION PROCESSING PROCEDURE

EXAMPLE OF FLOWCHART FOR CONVENTIONAL PROCESSING

POSITIONING CONTROL DEVICE AND DISK DEVICE

CROSS-REFERENCE TO RELATED APPLICATIONS

This application is based upon and claims the benefit of priority from the prior Japanese Patent Application No. 2006-060507, filed on Mar. 7, 2006, the entire contents of which are incorporated herein by reference.

BACKGROUND OF THE INVENTION

1. Field of the Invention

The present invention relates to a positioning control device for positioning a head of a disk device in a target position, and a disk device, and more particularly to a positioning control device and so on with which a calculation delay time extending from the acquisition of position information to the output of a control amount can be shortened.

2. Description of the Related Art

With a disk device for a disk such as an optical disk or magnetic disk, it is extremely important to position a head in a target position accurately.

Positioning control is performed by obtaining position information recorded on a medium in the disk device via a demodulation circuit, calculating a control amount for controlling an actuator, outputting the control amount to a drive circuit for driving the actuator, and driving the control subject actuator.

Examples of the prior art relating to this type of positioning control include a device for detecting a defect in servo information (position information) (Japanese Patent Laid-Open H5-62393, for example), a device which, when correct servo data (position information) cannot be extracted, prevents this inability to extract correct servo data from affecting subsequent servo data (Japanese Patent Laid-Open 2000-40318, for example), and so on.

A device for reducing overkill caused by needless write-inhibition also exists (Japanese Patent Laid-Open 2000-163872, for example). In this device, a predicted PES (Position Error Signal) is determined from a value obtained by reading an nth servo pattern, and when the predicted PES satisfies a fixed condition, data writing is prohibited.

Meanwhile, in this type of positioning control, various types of determination processing are performed in addition to calculation of the control amount (Japanese Patent Laid-Open H9-259555, particularly FIG. 2 and so on, and Japanese Patent Laid-Open H10-74371, particularly FIG. 3, for example). An example of a calculation processing procedure including this determination processing is shown in FIG. 17.

First, when a position signal recorded on a medium is acquired, a position error (a distance from a target position to the current position) is calculated. Determination and correction processing is then performed. During this determination and correction processing, the following three main processes are performed.

Firstly, a determination is made as to whether or not the obtained position information is correct, and if not, the position information is corrected. Secondly, a determination is made as to whether or not the calculated current position error is within a suitable range for executing a Read or Write operation. Thirdly, settling determination processing is performed immediately after a seek operation or following deviation from a target track.

Following these determination and correction processes, the control amount of the actuator is calculated, whereupon control calculation post-processing (prediction of the control amount of the following sample) is performed.

FIG. 18 shows an example of a series of processes performed during control calculation in the form of a flowchart. These processes are performed by a control unit in the disk device, for example.

When the processing beings (S100), the control unit calculates the position error (S101) and performs determination processing (S102). When it is determined as a result of the determination processing that the position error needs to be corrected (YES in S103), the control unit corrects the position error (S104), and calculates the control amount using the corrected position error (S105). When correction is not required (NO in S103) the control unit calculates the control amount using the position error calculated in S101 (S105). The calculated control amount is output to the actuator (S106), whereupon control calculation post-processing is performed (S107) The series of processes is then terminated (S108).

The time period from acquisition of the position information to output of the control amount is typically referred to as the calculation delay time. By reducing the calculation delay time, the phase margin can be improved. The phase margin is a reference for evaluating the control characteristics of a control model, and by improving the phase margin, the response speed during positioning control increases, leading to an improvement in control responsiveness. An improvement in the phase margin also leads to an improvement in the positioning accuracy.

Meanwhile, in the calculation processing described above, various determination processes are executed before the control amount is calculated. These processes are extremely important for ensuring the reliability of the obtained position information and position error and so on.

However, when these various determination processes are executed, the calculation delay time from acquisition of the position information to output of the control amount cannot easily be reduced.

SUMMARY OF THE INVENTION

The present invention has been designed in consideration of the problem described above, and it is an object thereof to provide a positioning control device and a disk device with which a calculation delay time can be reduced.

To achieve this object, the present invention is a positioning control device for positioning a head of a disk device in a target position, having a control unit which calculates a control amount of a positioning control control amount and outputs the control amount to a drive unit of the disk device for driving the head, and a storage unit which continues to hold a variable value, which is used to calculate the control amount prior to the start of calculation of the control amount, following calculation of the control amount, wherein the control unit re-executes calculation of the control amount using the variable value stored in the storage unit during calculation of the control amount or following calculation of the control amount.

In the positioning control device according to the present invention, the control unit has a first calculation unit and a second calculation unit, the first calculation unit executes calculation of the control amount and the second calculation unit executes determination processing relating to a positioning control state.

Further, in the positioning control device according to the present invention, the determination processing relating to the position control state determines whether or not the control calculation performed by the first calculation unit is correct, and when the second calculation unit determines that the control calculation performed by the first calculation unit is not correct, the second calculation unit corrects an input value of the control calculation.

Further, in the positioning control device according to the present invention, the control unit outputs the control amount to the drive unit immediately following calculation of the control amount.

Further, in the positioning control device according to the present invention, the first calculation unit outputs the calculated control amount to the drive unit upon input of a control amount output permission from the second calculation unit following calculation of the control amount.

Further, in the positioning control device according to the present invention, when the second calculation unit determines that the control calculation performed by the first calculation unit is not correct, the second calculation unit interrupts the control calculation of the first calculation unit, the first calculation unit or the second calculation unit corrects the input value of the control calculation and resets the variable value prior to the start of the control calculation, and the first calculation unit re-executes the control calculation using the corrected input value and the reset variable value.

Further, in the positioning control device according to the present invention, during re-execution of the control calculation, the first calculation unit executes calculation of the control amount using a different state variable depending on an output timing of the control amount.

Further, to achieve the aforementioned object, the present invention is a disk device for positioning a head in a target position, having a drive unit which drives the head, a control unit which calculates a control amount of a positioning control and outputs the control amount to the drive unit, and a storage unit which continues to hold a variable value, which is used to calculate the control amount prior to the start of calculation of the control amount, following calculation of the control amount, wherein the control unit re-executes calculation of the control amount using the variable value stored in the storage unit during calculation of the control amount or following calculation of the control amount.

Further, in the disk device according to the present invention, the control unit has a first calculation unit and a second calculation unit, the first calculation unit executes calculation of the control amount and the second calculation unit executes determination processing relating to a positioning control state.

Further, in the disk device according to the present invention, the determination processing relating to the position control state determines whether or not the control calculation performed by the first calculation unit is correct, and when the second calculation unit determines that the control calculation performed by the first calculation unit is not correct, the second calculation unit corrects an input value of the control calculation.

Further, in the disk device according to the present invention, the control unit outputs the control amount to the drive unit immediately following calculation of the control amount.

Further, in the disk device according to the present invention, the first calculation unit outputs the calculated control amount to the drive unit upon input of a control amount output permission from the second calculation unit following calculation of the control amount.

Further, in the disk device according to the present invention, when the second calculation unit determines that the control calculation performed by the first calculation unit is not correct, the second calculation unit interrupts the control calculation of the first calculation unit, the first calculation unit or the second calculation unit corrects the input value of the control calculation and resets the variable value prior to the start of the control calculation, and the first calculation unit re-executes the control calculation using the corrected input value and the reset variable value.

Further, in the disk device according to the present invention, during re-execution of the control calculation, the first calculation unit executes calculation of the control amount using a different state variable depending on an output timing of the control amount.

Further, to achieve the aforementioned object, the present invention is a positioning control method for positioning a head of a disk device in a target position, having the steps of continuing to hold in a storage unit a variable value, which is used to calculate a control amount prior to the start of calculation of the control amount, following calculation of the control amount, calculating the control amount of positioning control and re-executing calculation of the control amount using the variable value stored in the storage unit during calculation of the control amount or following calculation of the control amount, and outputting the control amount calculated during calculation of the control amount to a drive unit of the disk device for driving the head.

Further, to achieve the aforementioned object, the present invention is an information processing system having a disk device for positioning a head in a target position, the disk device having a drive unit which drives the head, a control unit which calculates a control amount of positioning control and outputs the control amount to the drive unit, and a storage unit which continues to hold a variable value, which is used to calculate the control amount prior to the start of calculation of the control amount, following calculation of the control amount, wherein the control unit re-executes calculation of the control amount using the variable value stored in the storage unit during calculation of the control amount or following calculation of the control amount.

The present invention can provide a positioning control device and a disk device with which a calculation delay time can be shortened.

BRIEF DESCRIPTION OF THE DRAWINGS

FIGS. 10A to 10F show examples of a calculation processing procedure using two calculation devices;

FIG. 13 shows an example of a flowchart showing a calculation processing operation executed by two calculation devices;

FIG. 14 shows an example of a flowchart showing a calculation processing operation executed by two calculation devices;

FIG. 16 shows an example of a flowchart showing a calculation processing operation executed by two calculation devices;

DESCRIPTION OF THE PREFERRED EMBODIMENTS

A preferred embodiment of the present invention will be described below with reference to the drawings.

Figure 1:
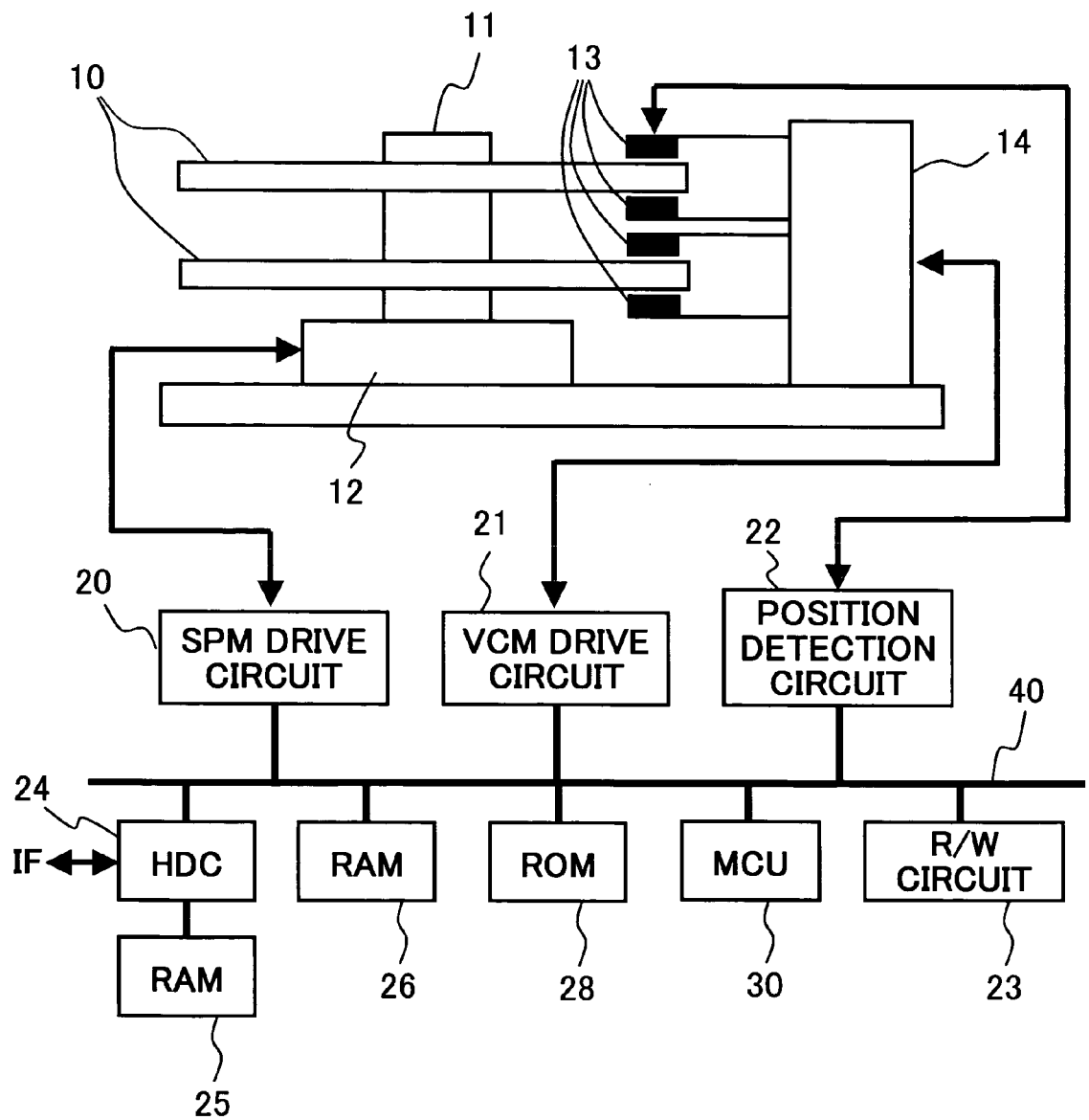
FIG. 1 shows a configuration example of a magnetic disk device to which the present invention is applied.

FIG. 1 shows a configuration example of a magnetic disk device to which the present invention is applied. A hard disk drive is used as an example of the disk device.

As shown in FIG. 1, the magnetic disk device 1 has a magnetic disk 10, a spindle motor 12, a magnetic head 13, and an actuator 14.

The magnetic disk 10 is disposed on a rotation axis 11 of the spindle motor 12. The spindle motor 12 rotates the magnetic disk 10 via the rotation axis 11.

The magnetic head 13 is comprised of read elements and write elements, and reads data from and writes data to the magnetic disk 10.

The actuator 14 is comprised of a voice coil motor (VCM), which rotates with an internal rotary axis as the center. The actuator 14 also has the magnetic head 13 on a tip end thereof, and is capable of moving the magnetic head 13 in the radial direction of the magnetic disk 10.

In the example shown in FIG. 1, two magnetic disks 10 are mounted on the magnetic disk device 1, and four magnetic heads 13 are simultaneously driven by the same actuator 14. Needless to say, this embodiment may be implemented with a single magnetic disk 10 and with three or more magnetic disks 10.

The magnetic disk device 1 further has a spindle motor (SPM) drive circuit 20, a voice coil motor (VCM) drive circuit 21, a position detection circuit 22, a read and write (R/W) circuit 23, a hard disk controller (HDC) 24, first and second random access memories (RAM) 25, 26, a read-only memory (ROM) 28, and a microcontroller (MCU) 30. Apart from the first RAM 25, these components are connected to each other via a bus 40.

The SPM drive circuit 20 drives the spindle motor 12 on the basis of a control signal from the MCU 30. The VCM drive circuit 21 supplies a drive current to the actuator 14, and drives the actuator 14, on the basis of the control signal from the MCU 30.

The position detection circuit 22 converts a position signal (servo signal hereafter) read by the magnetic head 13 from the magnetic disk 10 into a digital signal. The R/W circuit 23 controls the reading and writing operations of the magnetic head 13.

The HDC 24 judges a position within a track based on the sector number of the servo signal, and records and reproduces data. The HDC 24 communicates with a host via interface such as by ATA or SCSI.

The first RAM 25 is a memory for the HDC 24, and temporarily stores read data read by the magnetic head 13 and write data to be written to the magnetic disk 10 by the magnetic head 13. The second RAM 26 temporarily stores data used by the MCU 30 to perform various calculations.

The ROM 28 stores a control program of the MCU 30 and so on. The MCU 30 detects (demodulates) a current position from the servo signal (position signal) obtained from the position detection circuit 22 by reading and executing the control program and so on from the ROM 28, executes a control calculation in accordance with a position error between the detected current position and a target position, and outputs a control signal to the VCM drive circuit 21. This control calculation processing will be described in detail below.

Figure 2:
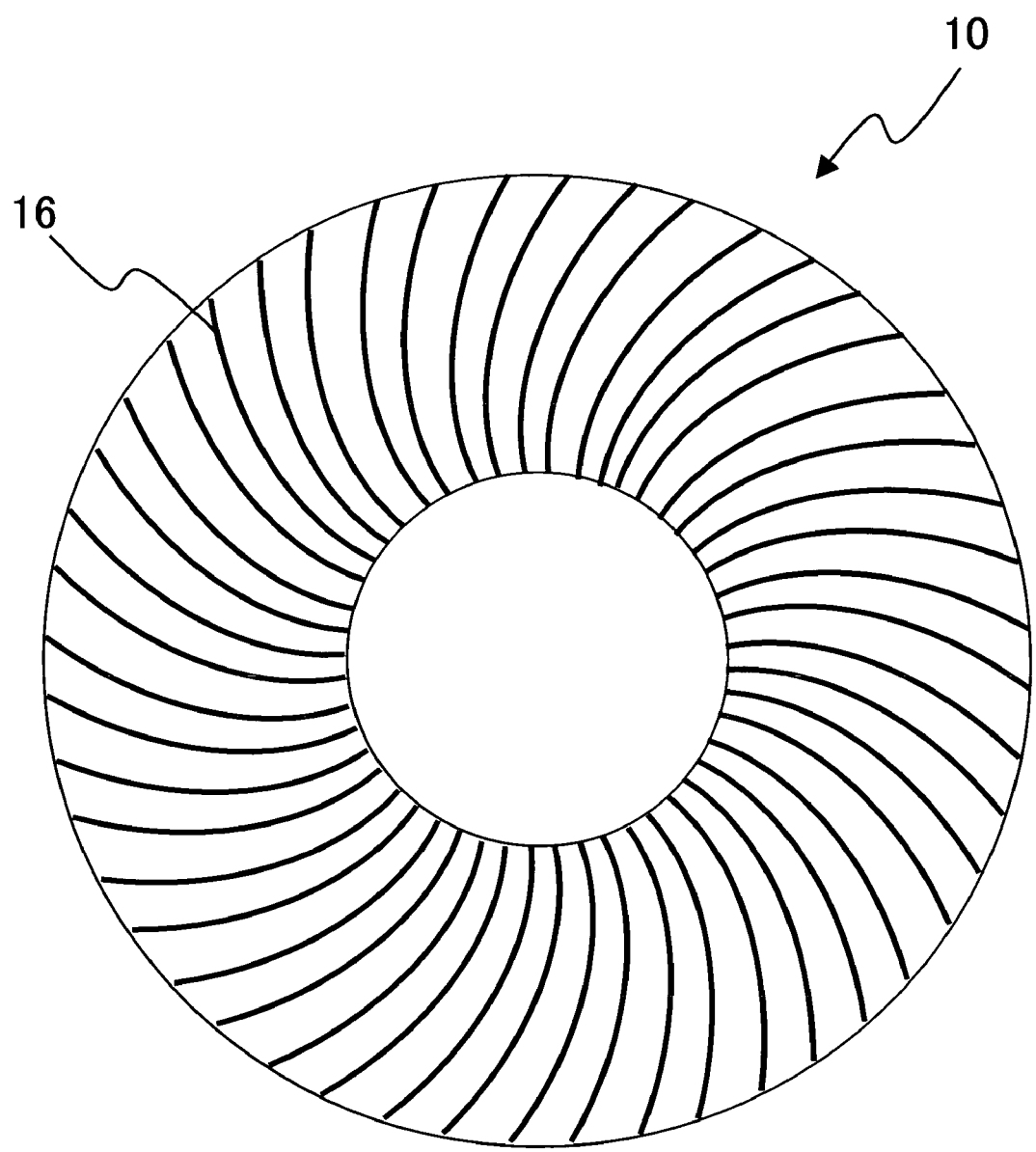
FIG. 2 shows an example of the recorded positions of position signals recorded on the magnetic disk.

FIG. 2 shows an example of the arrangement of servo signals 16 recorded on the magnetic disk 10. As shown in FIG. 2, the servo signals 16 are arranged at equal intervals from the inner perimeter to the outer perimeter of the magnetic disk 10. The magnetic disk device 1 can detects the current position of the magnetic head 13 and so on by reading the servo signal 16.

Figure 3:
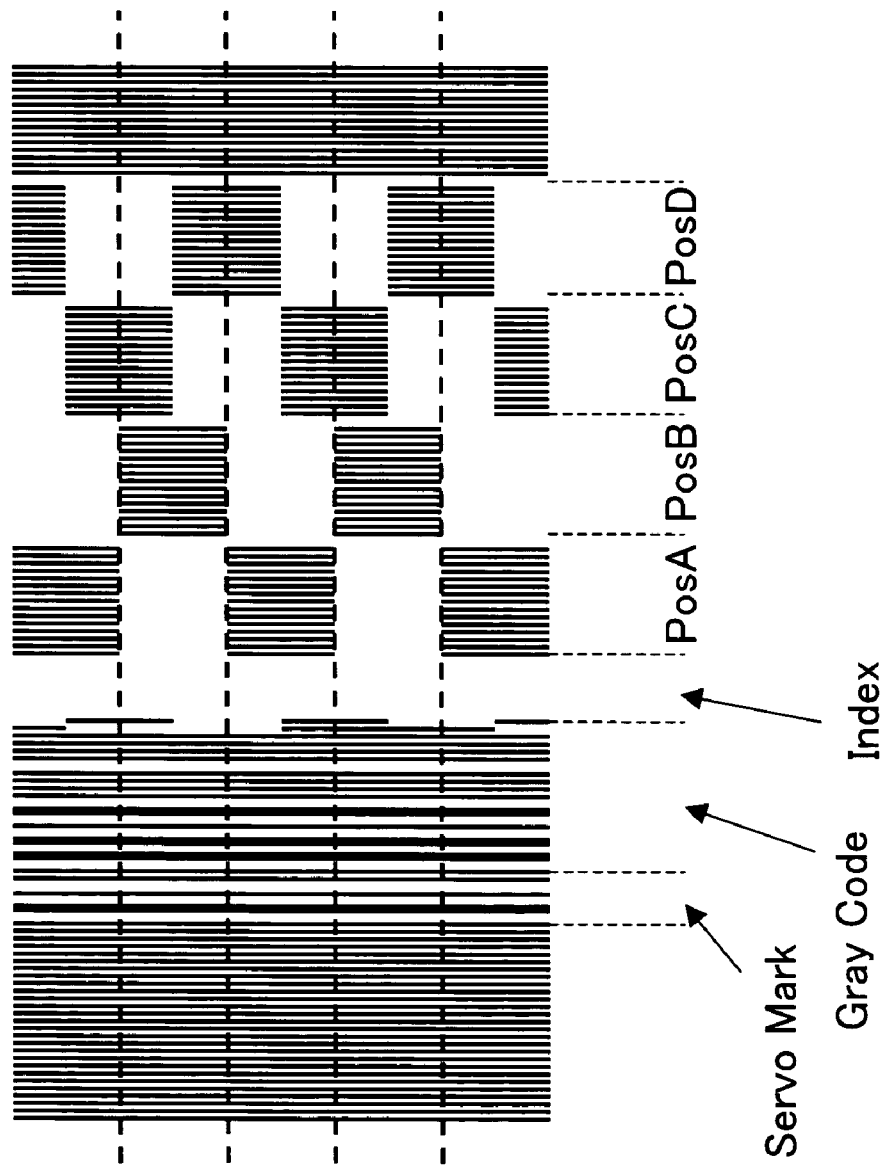
FIG. 3 shows an example of a position signal recording format.

FIG. 3 shows an example of a servo signal 16 recording format. As shown in FIG. 3, the servo signal 16 is comprised of a servo mark (Servo Mark) indicating a starting position of the servo signal 16, a gray code (Gray Code) indicating a track number, an Index signal (Index) indicating an index of the servo signal 16, and four offset signals (PosA, PosB, PosC, PosD).

Figure 4:
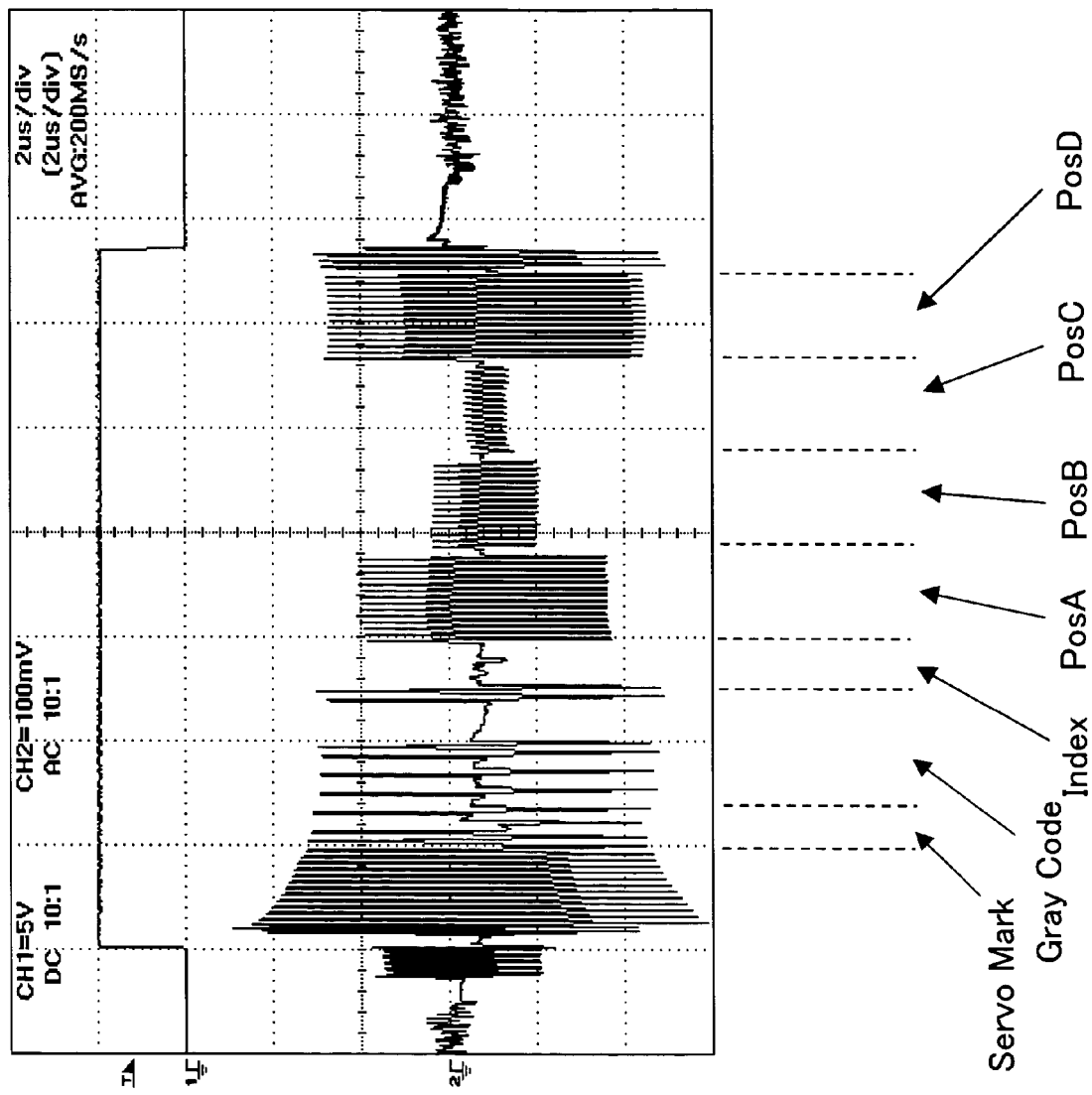
FIG. 4 shows an example of a waveform diagram obtained when a position signal is read.

FIG. 4 shows an example of a signal waveform diagram obtained when the servo signal 16 is read by the magnetic head 13. The MCU 30 detects the position of the magnetic head 13 using this type of waveform.

More specifically, the radial direction position of the magnetic head 13 is detected by the MCU 30 using the track number Gray Code and the offset signals PosA to PosD.

The circumference direction position of the magnetic head 13 is detected from the index signal Index. For example, the MCU 30 sets the sector number to "0" upon detection of the index signal Index, and obtains each sector number of the track by incrementing the sector number every time the servo signal 16 is detected.

Figure 5:
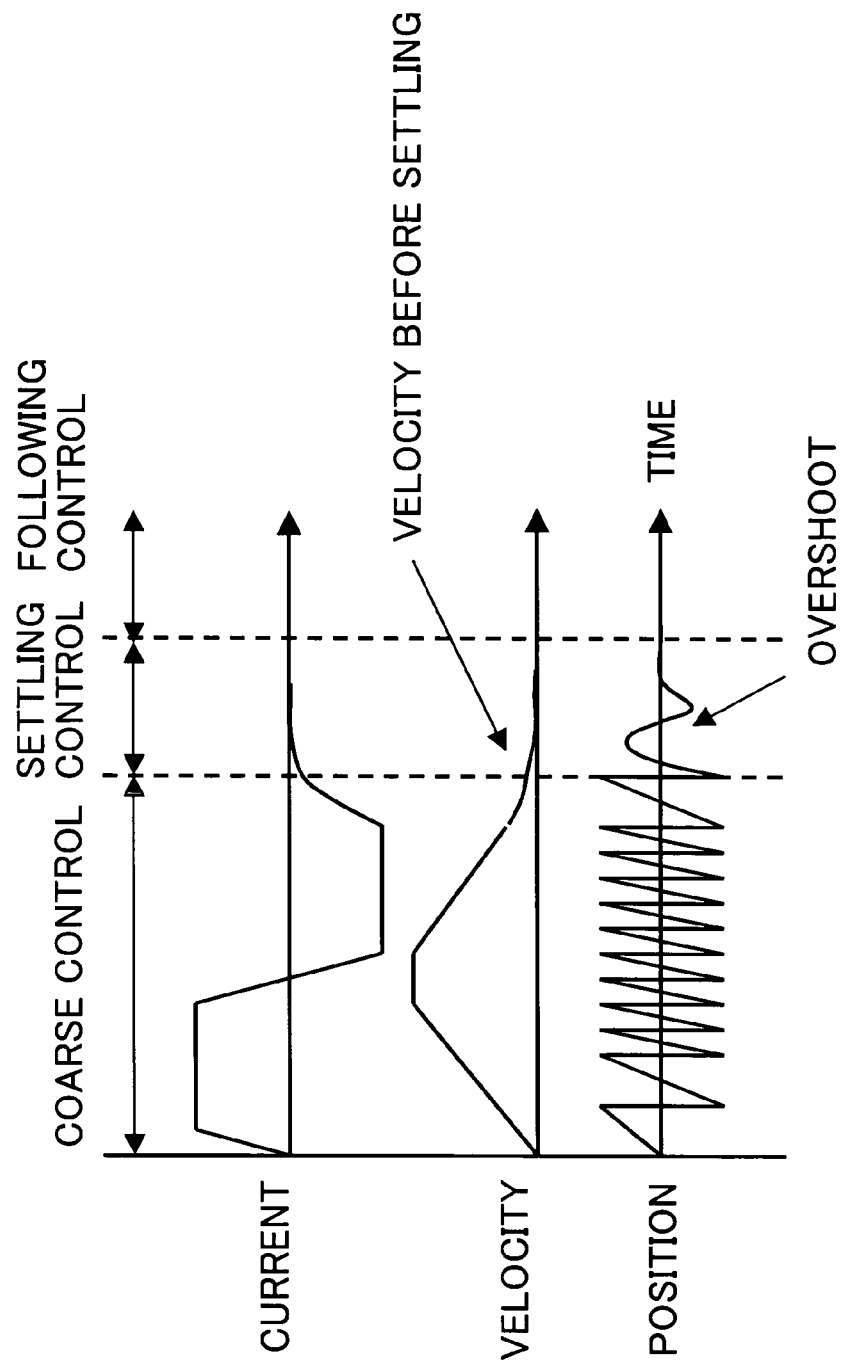
FIG. 5 is an illustrative view of a seek operation.

FIG. 5 shows an example of seek control of the actuator 14, performed by the MCU 30. FIG. 5 shows transitions of seek control for moving the magnetic head 13 from a certain track position to a target track position, the current flowing through the actuator 14, the movement velocity of the magnetic head 13, and the position of the magnetic head 13.

The magnetic head 13 can be moved to the target position by transiting as coarse control, setting control, and following control. The coarse control is velocity control to the target position, while the settling control and the following control are position control to the target position.

Figure 6A:
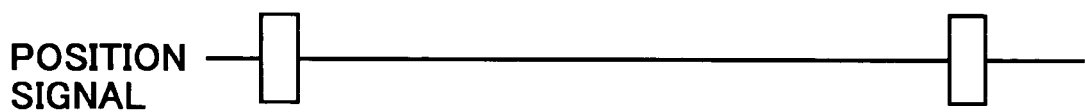
FIGS. 6A and 6B show examples of a calculation processing procedure.
Figure 6B:
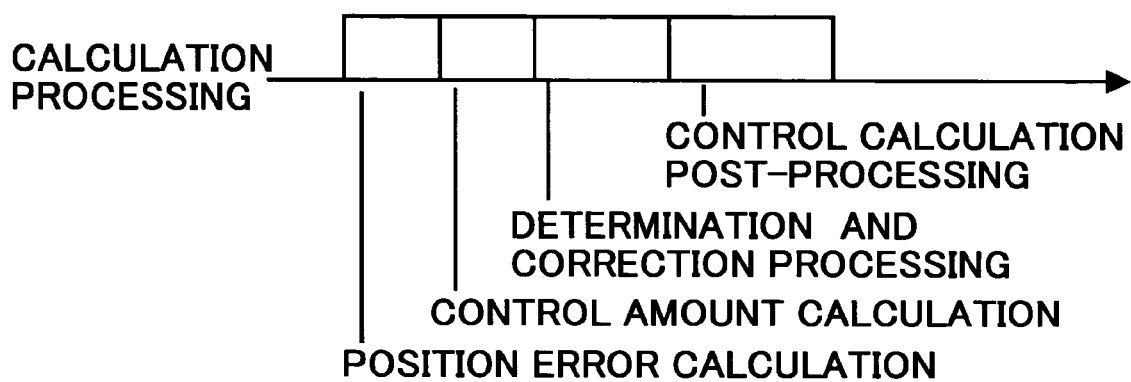

FIGS. 6A and 6B show examples of a calculation processing procedure executed by the MCU 30 in this embodiment. This processing extends from acquisition of the position signal to output of the control amount. FIGS. 6A and 6B show examples of a single sample period. Squares of the position signal in the drawing indicate the section from the servo mark to PosD in the signal waveform diagram shown in FIG. 4.

Figure 17A:
FIGS. 17A and 17B show examples of a conventional calculation processing procedure.
Figure 17B:
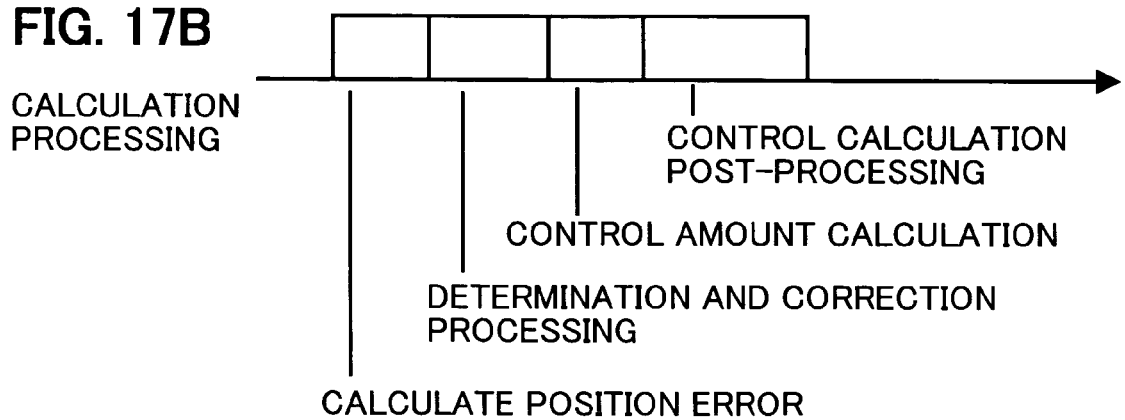
Figure 18:
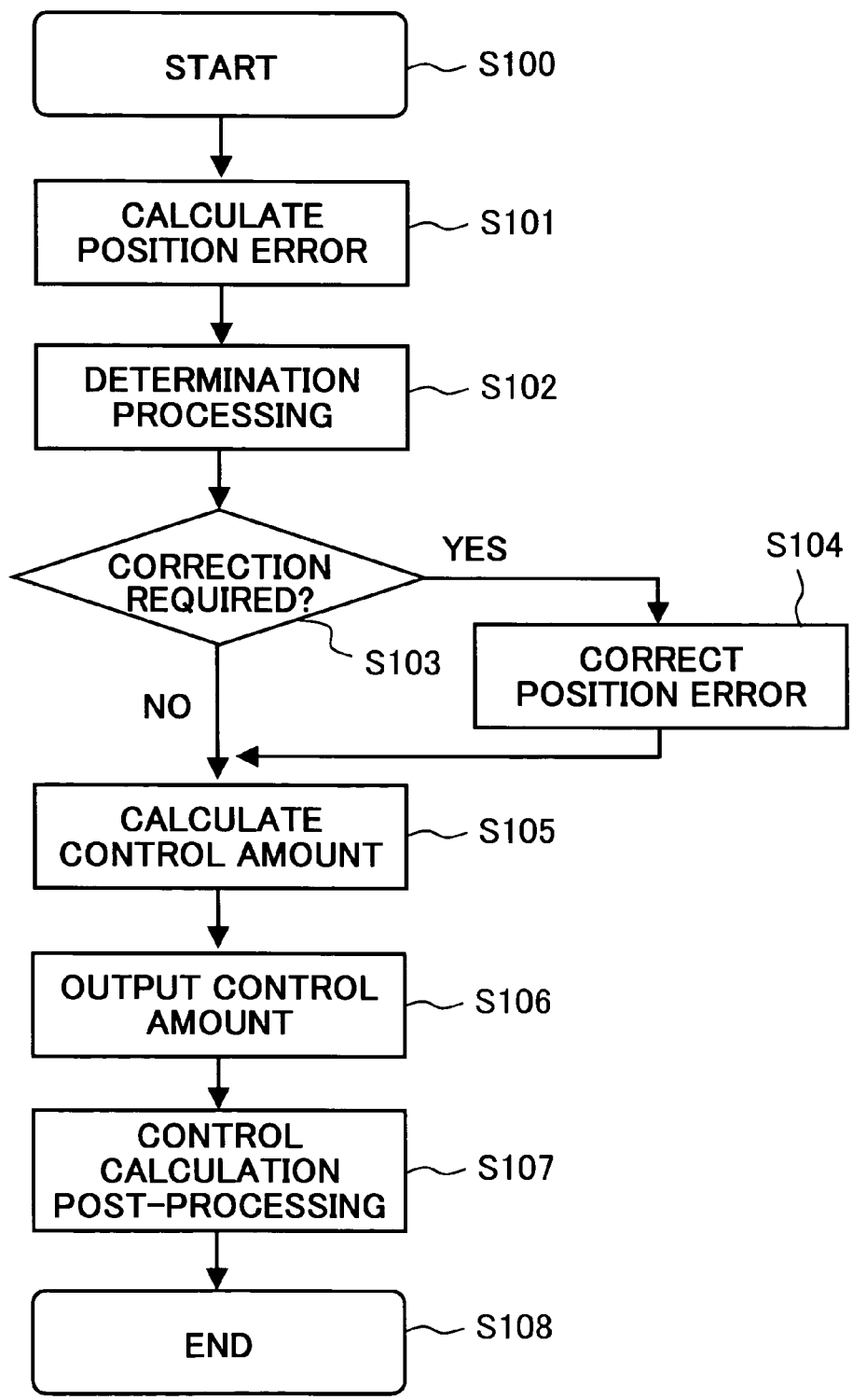
FIG. 18 shows an example of a flowchart showing a conventional calculation processing operation.

The calculation processing procedure executed by the MCU 30 differs from the conventional procedure (FIG. 17) in that control amount calculation is performed first following position error calculation, and then determination and correction processing is performed. By performing control amount calculation first, the output timing of the control amount (in this embodiment, a drive current output from the MCU 30 to the actuator 14 via the VCM drive circuit 21) can be advanced in comparison with the conventional procedure.

Figure 7:
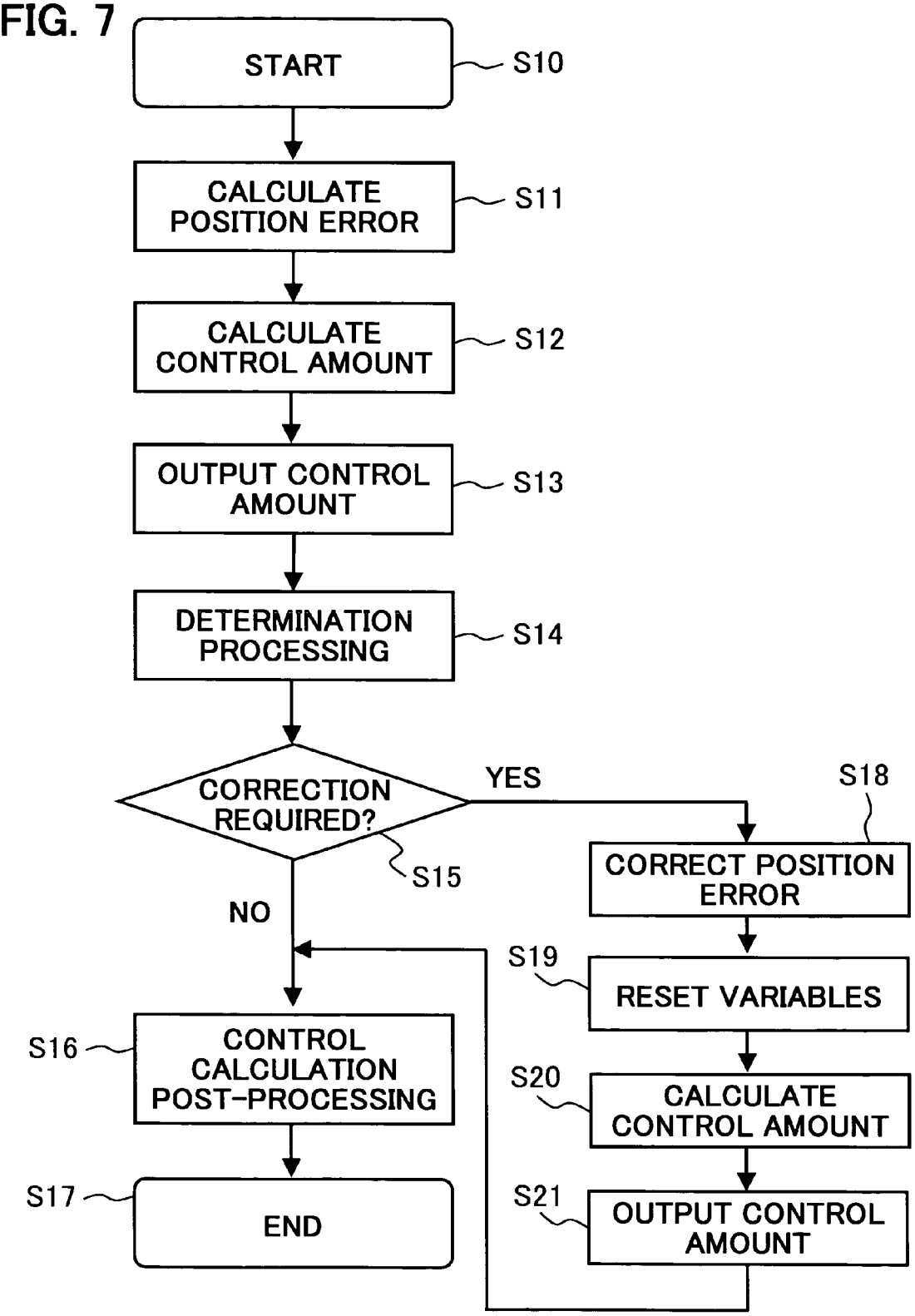
FIG. 7 shows an example of a flowchart showing a calculation processing operation.

FIG. 7 shows an example of a flowchart of the control calculation processing that is executed by the MCU 30. First, the MCU 30 begins the processing by reading the program stored in the ROM 28 (S10). In reality, after detection of the servo signal 16, interruption processing is applied to the MCU 30, processing in relation to the IF of the HDC 24 and so on is temporarily halted, and then control calculation processing begins.

Next, the MCU 30 calculates the position error (the error from the target position to the current position) (S11), and then performs control amount calculation (S12) Following the control amount calculation, the MCU 30 outputs the control amount to the actuator 14 via the VCM drive circuit 21 (S13), whereupon executes the determination processing (S14).

The determination processing includes, for example, a determination as to whether or not the obtained servo signal 16 is correct, a determination as to whether or not the current position error is within a suitable range for performing data reading (Read) or writing (Write) in relation to the magnetic disk 10 (processing for outputting Read, Write permission and prohibition), settling determination processing immediately after seek control or following deviation from the target track (seek control ends when several continuous samples are within a predetermined range etc.), and so on.

If it is determined that the position error does not need to be corrected (NO in S15), the control calculation post-processing (S16) is performed. In control calculation post-processing, the control amount (for example the position and velocity of the actuator 14 (or the magnetic head 13)) for the next sample is calculated.

If, on the other hand, the position error needs to be corrected (YES in S15), the MCU 30 corrects the position error calculated in S11 (S18) and resets variables used to execute the control calculation (S19). The MCU 30 then calculates the control amount again using the reset variable values (S20) and outputs the control amount (S21). Control calculation post-processing is then performed (S16), whereupon the series of control calculation processes is terminated (S17).

The aforementioned control amount calculation (S12, S20) will now be described in detail. In the positioning control of this magnetic disk device 1, when single rate control is performed using an observer known in automatic control terms, the following calculation formulae are executed.

First, Xh [k], denoting the current position and velocity of the actuator 14 (or the magnetic head 13), is calculated using the following Equation (1).

$$Xh[k]=Xb[k]+L\cdot(y[k]-C\cdot Xb[k]) \quad (1)$$

where Xb [k] denotes the position and velocity of the preceding sample, L denotes a matrix including the estimated gains (two gains of the position and velocity) of the observer, y [k] denotes an observation position (the current position of the magnetic head 13), and C denotes a matrix constituted by [1] and [0]. In Equation (1), the difference between the observation position and the calculated current position (the estimated position error) is calculated in the parentheses on the right side of Equation (1) and added to the position and velocity Xb [k] of the preceding sample to calculate the current position and velocity Xh [k].

A current u [k] to be applied to the actuator 14 is then calculated using the following Equation (2).

$$u[k]=-F\cdot Xh[k] \quad (2)$$

where F is a matrix including the gains of the position and velocity.

Thus control amount calculation (S12, S20) is performed by calculating the current position and velocity Xb [k] of the actuator 14 and so on using Equation (1), and calculating the current u [k] using Equation (2).

When a notch filter is added to the output of the current u [k] to suppress resonance, the resulting output uout [k] is also subjected to control amount calculation processing (S12, S20). In this case, the calculation formula is as follows.

$$uout[k]=\text{NotchFilter}(u[k]) \quad (3)$$

Note that NotchFilter ( ) denotes a state variable of the notch filter.

In control calculation post-processing (S16), the predicted position and velocity Xb [k+1] of the next sample are calculated, and in this case, the following Equation (4) is used.

$$Xb[k+1]=A\cdot Xh[k]+B1\cdot u[k]+B2\cdot u[k-1] \quad (4)$$

where A and B respectively denote matrices. In Equation (4), the position and velocity of the next sample is predicted by adding together a value obtained by applying the matrix A to the current position and velocity Xh [k] and a value obtained by applying the matrices B1 and B2 respectively to the currents u [k] and u [k−1] output to the actuator 14.

To solve the Equations (1) to (4) described above, the position error (in particular the observation position y [k] and the content of the parentheses in Equation (1)) must be confirmed.

However, the position error cannot be determined merely from the current demodulated position and target position, and instead it is necessary to determine whether or not the demodulated position is within a predicted range while envisaging a demodulation error, and if not, it is necessary to replace the value thereof with the prediction value.

Hence, in the control amount calculation, various determination processes and correction processes must be performed before executing Equations (1) to (4). Control amount calculation (S12, S20) and post-processing (S16) can only be performed on the basis of Equations (1) to (4) after these various determination processes and so on have been executed.

However, the likelihood of having to correct the position error is low. It is therefore undesirable to extend the calculation delay time from acquisition of the position information to output of the control amount for the sake of low-probability processing.

Hence, in this embodiment, as shown in FIGS. 6 and 7, control amount calculation processing (S12) is executed immediately after position error calculation (S11) to calculate the control amount, and determination and correction processing (S14, S14) is performed thereafter.

In this embodiment, the control amount is output first following position error calculation, and determination and correction processing is performed thereafter, and hence the control amount can be output earlier than a case in which determination and correction processing is performed after position error calculation, and control amount calculation and output is performed thereafter. As a result, a reduction in the calculation delay time can be achieved.

In certain cases (YES in S15) , it may be determined in the determination processing (S14) that the position error needs to be corrected following calculation of the control amount.

In such cases, the position error is corrected (S18), whereupon the control amount is re-calculated (S19 to S21).

When re-calculating the control amount, the MCU 30 resets the variable values (S19), and at this case, the MCU 30 performs processing by rewriting (overwriting) the state variables prior to the start of calculation, which are stored in a variable storage area of the memory (RAM 26 or the like), with the reset variables.

Examples of state variables include Xh [k] indicating the current position and velocity, Xb [k] denoting the preceding position and velocity, from Equation (1) and so on, the notch filter state variable of Equation (3) when notch filter is added, and so on.

When the variable values are overwritten, the variable values prior to the start of calculation can no longer be used. As a result, the control calculation is performed with erroneous reset variable values, leading to the output of an erroneous control amount.

Hence, in this embodiment the variable values prior to the start of calculation are stored in a save area of the memory. The variable values are then read from the save area and used to calculate the control amount (S12, S13). When correction is not required (NO in S15), the processing advances as is.

On the other hand, when correction is required (YES in S15), control amount calculation (S12) is halted temporarily, the variable values prior to the start of calculation are read from the save area, the position error is corrected (S18), the variables are reset (S19), and control amount calculation is performed using the reset variable values (S20). In this case, the reset variable values are stored in an overwrite area which is separate from the save area. The variable values prior to the start of calculation continue to be stored in the save area of the memory following the completion of the control calculation.

Hence in this embodiment, the variable values prior to the start of calculation are stored in a save area of the memory, and are therefore not overwritten during variable resetting. As a result, the variable values prior to the start of calculation can be used during variable resetting processing, and the reset variable values can be used during control amount calculation.

Figure 8A:
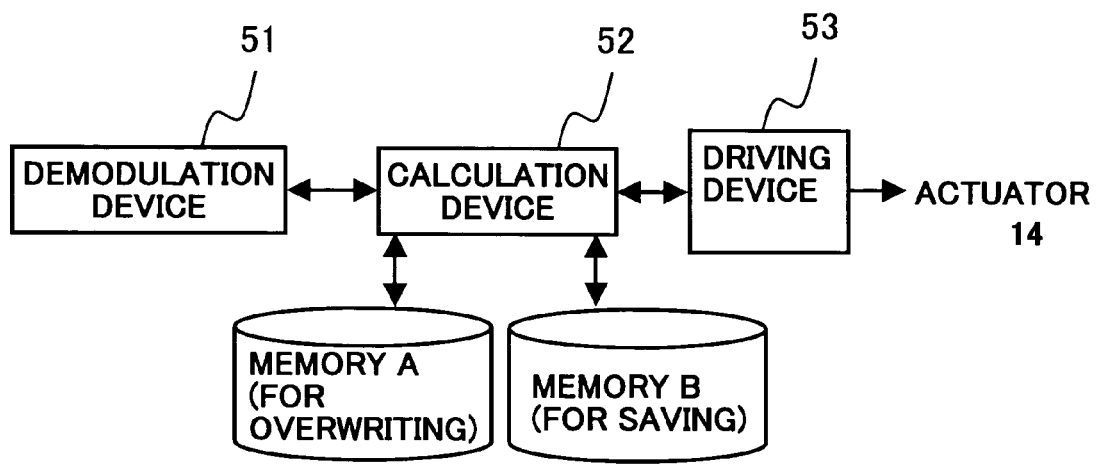
FIG. 8A shows a configuration example of the main parts of a magnetic disk device having two memories.
Figure 8B:
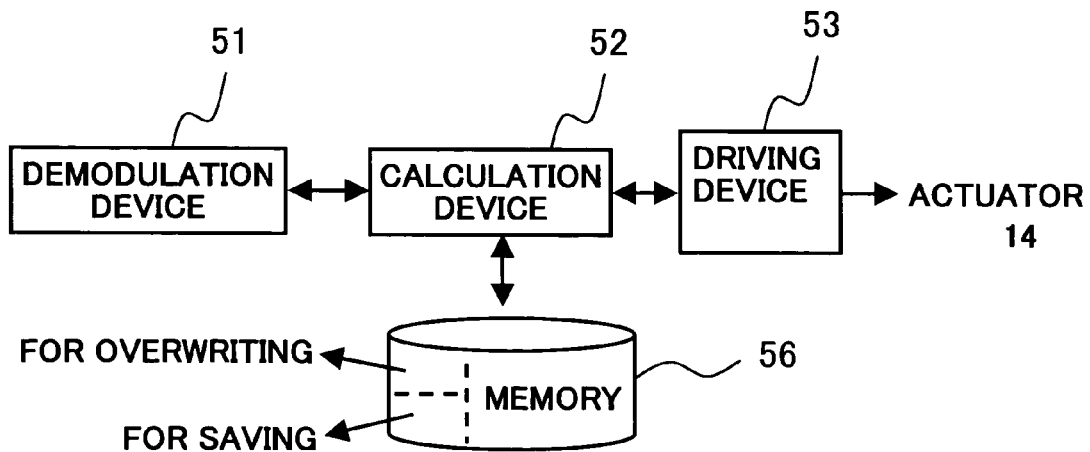
FIG. 8B shows a configuration example of the main parts of a magnetic disk device having one memory.

FIGS. 8A and 8B shows a configuration example of the magnetic disk device 1 in which the memory is provided with a save area. Only the main parts are shown.

As shown in FIG. 8A, the magnetic disk device 1 has a demodulation device 51 for demodulating the position error, a calculation device 52 for calculating the control amount, a driving device 53 for driving the actuator 14 on the basis of the control amount, and two memories A and B.

The demodulation device 51 corresponds to the magnetic head 13 and position detection circuit 22 in FIG. 1. The calculation device 52 corresponds to the MCU 30. The driving device 53 corresponds to the VCM drive circuit 21.

The memory B serves as a save memory for storing variable values and constant values prior to the start of calculation. The memory A serves as an overwrite memory for storing reset variable values.

In FIG. 8A, the save area and overwrite area are provided by two separate memories A and B, but these areas may be constituted by a single memory 56, as shown in FIG. 8B. In other words, a variable area of the memory 56 may be divided into an overwrite area and a save area.

An example of a so-called single processor, in which the control amount is calculated by the single MCU 30, was described above. Below, an example in which the control amount is calculated by two processors will be described.

Figure 9:
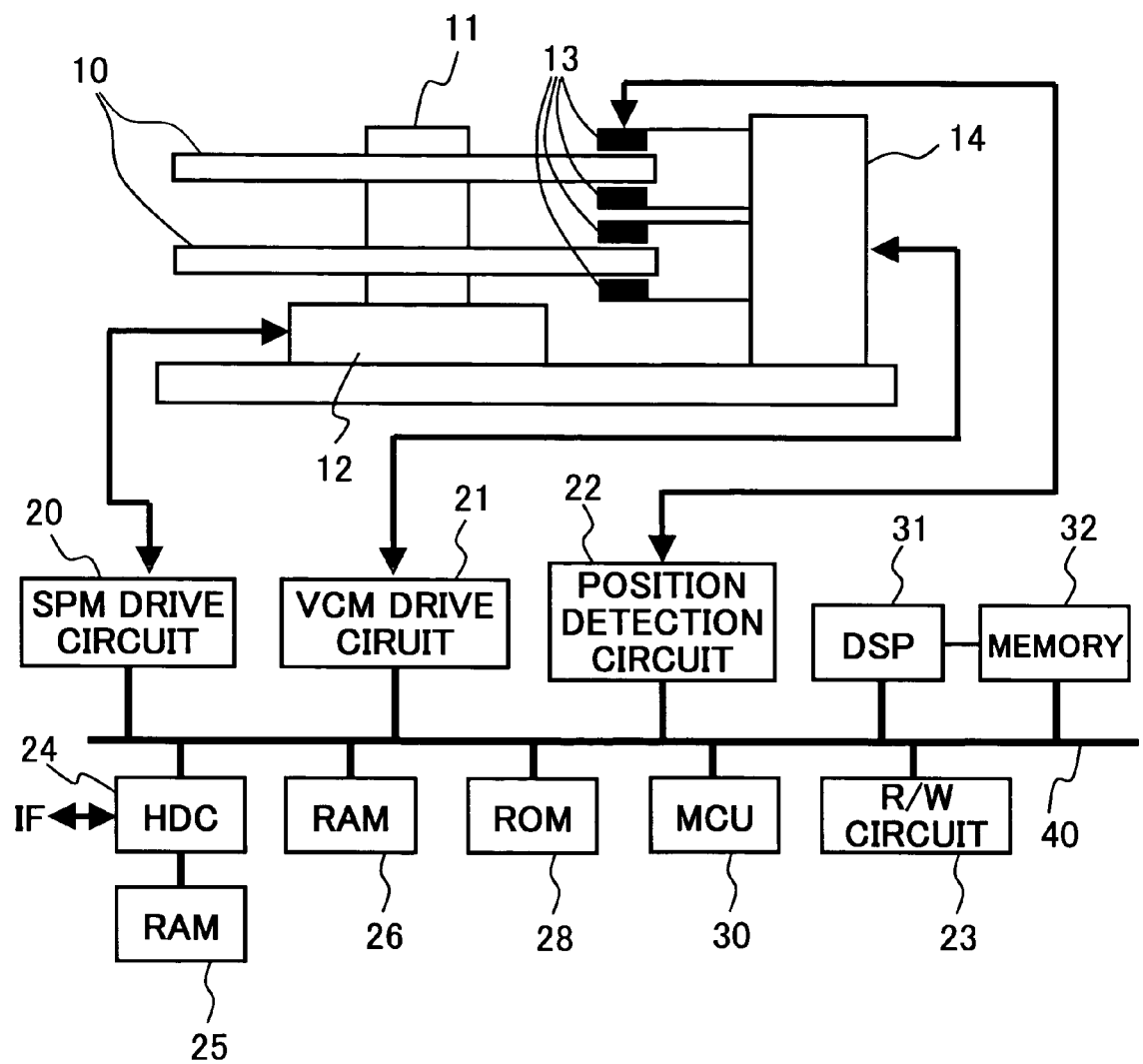
FIG. 9 shows a configuration example of a magnetic disk device having two calculation devices.

FIG. 9 is an example of the magnetic disk device 1 constituted such that control calculation is performed by two processors, the MCU 30 and a digital signal processor (DSP) 31.

The DSP 31 is a dedicated control calculation processor while the MCU 30 is a universal processor. A memory 32 is connected to the DSP 31. The bus 40 is also connected to the memory 32 to enable access from the MCU 30. All other constitutions are substantially identical to those of FIG. 1.

FIGS. 10A and 10B shows an example of the calculation processing procedure that is performed when two processors are used. A calculation device A is assumed to be the DSP 31, while a calculation device B is assumed to be the MCU 30.

As shown in FIG. 10A to 10C, upon acquisition of the position signal via the demodulation circuit, the calculation device A calculates the position error, performs control amount calculation, and then performs control calculation post-processing. Meanwhile, the calculation device B performs determination and correction processing following acquisition of the position signal. The respective processes are substantially identical to those of the example described above.

Determination and correction processing is performed by the calculation device B upon acquisition of the position signal, and in this processing, certain determinations can be made without calculating the position error and so on. Examples of these determinations include a determination as to whether or not the servo signal 16 is correct and a determination as to whether or not a shock has been generated, which is made according to a value from a shock sensor when one is mounted in the magnetic disk device 1. This determination processing is performed by the calculation device B following acquisition of the position signal and before calculation of the position error.

In comparison with the example of the single processor (FIGS. 6A and 6B), control amount calculation is performed following position error calculation, and hence the control amount is output at a substantially identical timing. As a result, the calculation delay time can be reduced in a similar manner to that of the single processor example.

Meanwhile, in this example determination and correction processing is performed by the calculation device B following acquisition of the position signal. As a result, an overall reduction in the calculation processing time can be achieved.

FIG. 10D to 10F also show examples of a calculation processing procedure performed by the two calculation devices A, B. In this example, however, correction must be performed on the calculated control amount.

The calculation device A calculates the position error upon acquisition of the position signal and then performs control amount calculation (control amount calculation 1). The calculation device B performs determination and correction processing upon acquisition of the position signal, and when the position error calculated by the calculation device A needs to be corrected, the calculation device A temporarily halts control amount calculation. The calculation device B then resets the variables, whereupon the calculation device A executes control amount calculation (control amount calculation 2) using the reset variables.

During control calculation, the variables are set as needed, similarly to the example described above, and calculation is performed as the variables are rewritten (overwritten). When the position error needs to be corrected, calculation must be terminated forcibly and then re-executed using the pre-correction variable values.

In this example also, the variable values prior to the start of calculation are stored in the save area and the reset variable values are stored in a separate memory or another area of the same memory. As a result, the variable values prior to the start of calculation are not overwritten during variable resetting, and hence it is possible to execute processing of variable resetting using the variable values prior to the start of calculation and control amount calculation using the reset variable values.

Figure 11A:
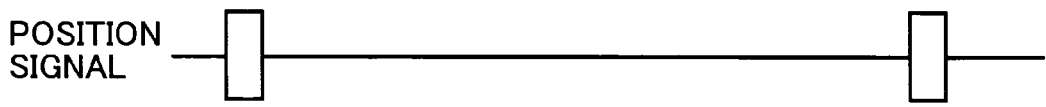
FIG. 11A to 11C show examples of a calculation processing procedure using two calculation devices.
Figure 11B:
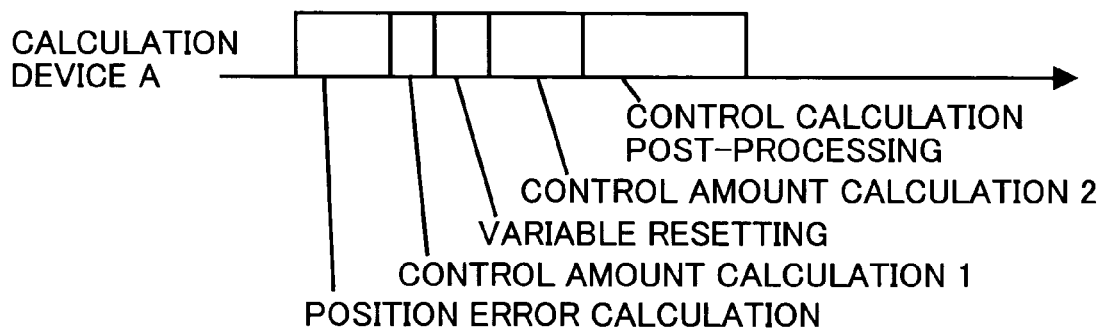
Figure 11C:
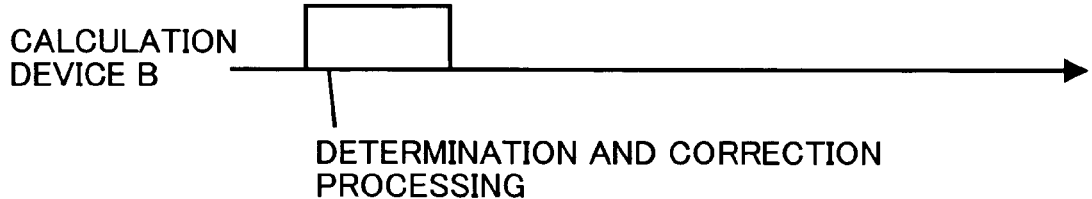

FIG. 11A to 11C show other examples of a calculation processing procedure using the two calculation devices A, B. In this case, processing of variable resetting is performed on the calculation device A side. When correction is required during calculation of the control amount, calculation is halted temporarily. And the variables can be reset on the calculation device A side, whereupon control amount calculation is performed using the reset variables.

The determination as to whether processing of variable resetting is to be performed by the calculation device A or the calculation device B may be made in accordance with the respective memory capacities of the calculation devices A and B, for example. When the memory capacity on the calculation device A side is small, processing of variable resetting is performed on the calculation device B side, as shown in FIG. 10D to 10F, and when the memory capacity on the calculation device B side is small, processing of variable resetting is performed on the calculation device A side, as shown in FIG. 11A to 11C. Alternatively, processing of variable resetting may be performed according to the performance of the calculation devices A, B.

Figure 12A:
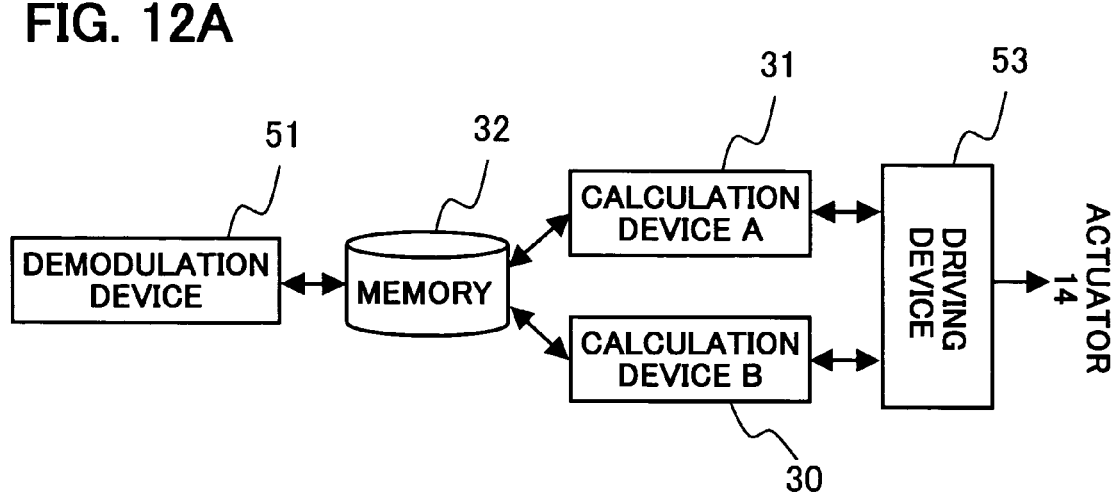
FIGS. 12A and 12B show configuration examples of the main parts of a magnetic disk device having two calculation devices.

FIG. 12A shows a configuration example of the main parts of the magnetic disk device 1 including the two calculation devices A, B. The demodulation circuit 51 and driving device 53 are similar to those shown in the example in FIG. 8.

The calculation devices A, B perform control amount calculation and so on based on the variable values stored in the memory 32. In this case, the memory 32 is divided into a save area storing the variable values prior to the start of calculation and an overwrite area storing the rewritten variable values. The overwrite area is used when variable resetting is performed by the calculation device A or the calculation device B.

Figure 12B:
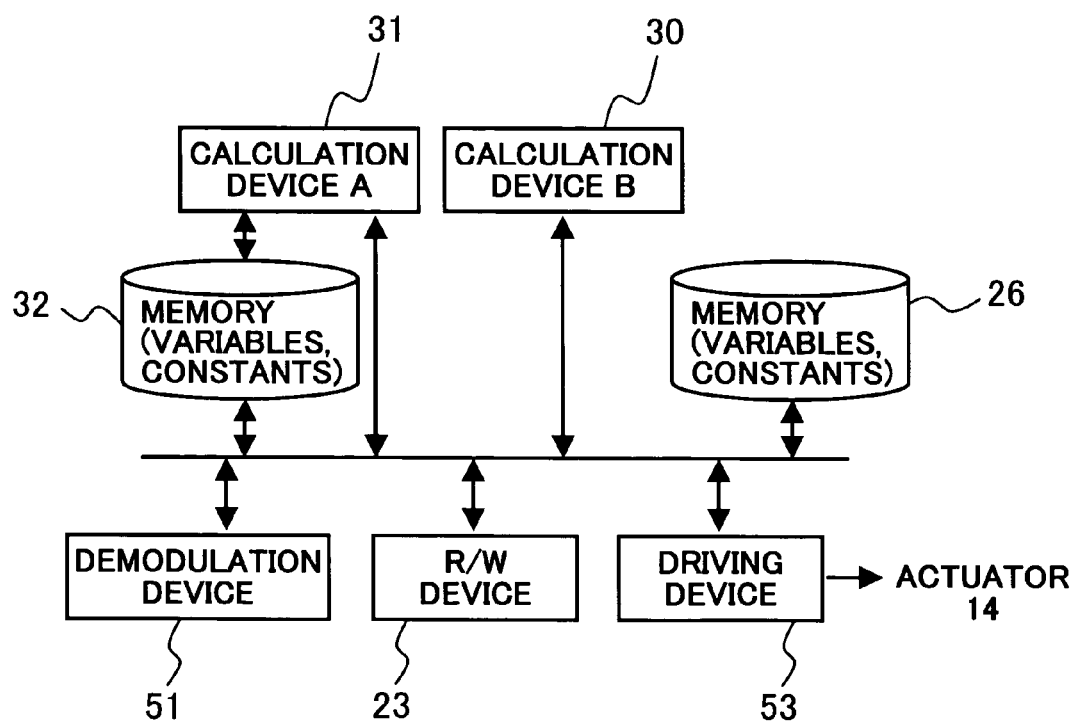

Likewise, FIG. 12B shows a configuration example of the main parts of the magnetic disk device 1 including the two calculation devices A, B. In this case, the memory 32 stores the variable values prior to the start of calculation as the save area, while the memory 26 (second RAM 26) of the calculation device A stores the variable values and constant values (including the rewritten variable values) required for control calculation.

Next, using FIGS. 13 to 16, an example of the processing procedures executed by the calculation device A and the calculation device B will be described.

FIG. 13 shows an example of a case in which variable resetting is performed on the calculation device B side (FIG. 10D to 10F). Identical reference symbols are allocated to processes which are identical to those shown in FIG. 7.

The calculation device A begins the processing (S30) and then calculates the position error (S11). Similarly to FIG. 7, processing is begun by means of interruption processing following acquisition of the position signal.

Next, the calculation device A calculates the control amount (S12) and then waits for permission to output the control amount from the calculation device B side (a NO loop in S31). The control amount is calculated using the above Equations (1) through (3).

Meanwhile, the calculation device B begins processing (S40) and executes determination processing 1 (S41). As described above, determination processing 1 is executed to determine whether or not the position signal is correct, to determine whether or not the shock has generated in the shock censor, and so on.

Next, the calculation device B judges whether or not position error calculation is complete (S42). When the calculation device A completes position error calculation (S11), it outputs a corresponding control signal to the calculation device B. The calculation device B determines that calculation is complete upon reception of this control signal.

The calculation device B awaits the completion of calculation (a NO loop in S42), and when calculation is complete (YES), executes determination processing 2 (S43). The determination processing 2 is a processing to permit or prohibit Read or Write processing, for example.

The calculation device B then judges whether or not the position error needs to be corrected (S15) by means of the determination processing (S41, S43). When correction is not required (NO in S15), the calculation device B outputs output permission to the calculation device A (S46).

When correction is required (YES in S15), the calculation device B forcibly halts calculation (S44), corrects the position error (S18), resets the variables (S19), and outputs a calculation execution instruction to the calculation device A (S45). The calculation device B then outputs the output permission (S46) to the calculation device A and terminates the series of control calculation processes (S47).

Upon reception of the calculation execution instruction (S45), the calculation device A re-begins the processing (S30) from the state of waiting for output permission (S31), corrects the position error (S11) using the reset variables (S19), and re-calculates the control amount (S12).

Having received the output permission, the calculation device A outputs the calculated control amount (S13). The reason for outputting the control amount following reception of the output permission is to confirm that the control amount value (current value) may actually be output.

Next, the calculation device A executes control calculation post-processing (S16). Similarly to the example described above, control calculation post-processing is a processing to solve Equation (4). The calculation device A then terminates the series of control calculation processes (S32).

In this processing, the variable values prior to the start of calculation are stored in the save area of the memory, while the variables set during variable resetting (S19) are stored in the overwrite area of the memory which is separate from the save area.

FIG. 14 shows an example of a case in which processing is performed using a "Mode" indicating whether or not correction is required, and the predicted position and velocity are calculated using the current value, too, of the preceding sample during control calculation post-processing. Identical reference symbols is allocated to processes which are identical to the calculation processes shown in FIG. 13 and so on.

As shown in FIG. 14, the calculation device B sets "Mode" to "0" (S62) when the position error does not need to be corrected (NO in S15), and sets "Mode" to "1" (S61) when correction is required (YES in S15).

Following output of the control amount (S13), the calculation device A judges whether or not "Mode" is at "0" (S51), and if "Mode" is at "0" (YES in S51), performs control calculation post-processing in a normal mode (S52). On the other hand, when "Mode" is at "1" (NO in S51), control calculation post-processing is performed in a delay mode (S53).

The calculation formulae employed as the control calculation post-processing of this example are as follows.

$$Xb[k+1]=A \cdot Xh[k]+B1 \cdot u[k]+B2 \cdot u[k-1] \quad (5)$$

$$Xb[k+1]=A \cdot Xh[k]+B3 \cdot u[k]+B4 \cdot u[k-1] \quad (6)$$

The output timing of the current u [k] differs between a case in which the position error is corrected and the control amount is re-calculated and a case in which the control amount is calculated without correction. When correction is not performed, the output timing of the current u [k] is earlier than that of a case in which correction is performed.

During control calculation post-processing, Equation (5) is used when the output timing is early (S52), and Equation (6) is used when the output timing is late (S53).

In this processing also, the variables prior to the start of calculation are stored in the save memory, while the reset variables in the processing of variable resetting (S19) are stored in an overwrite memory which is separate from the save area.

Similarly to the example described above, in this example the calculation delay time can be shortened, and when resetting the variables, the variable values prior to the start of calculation are stored separately in the save memory so that resetting calculation can be performed using these variable values.

Figure 15:
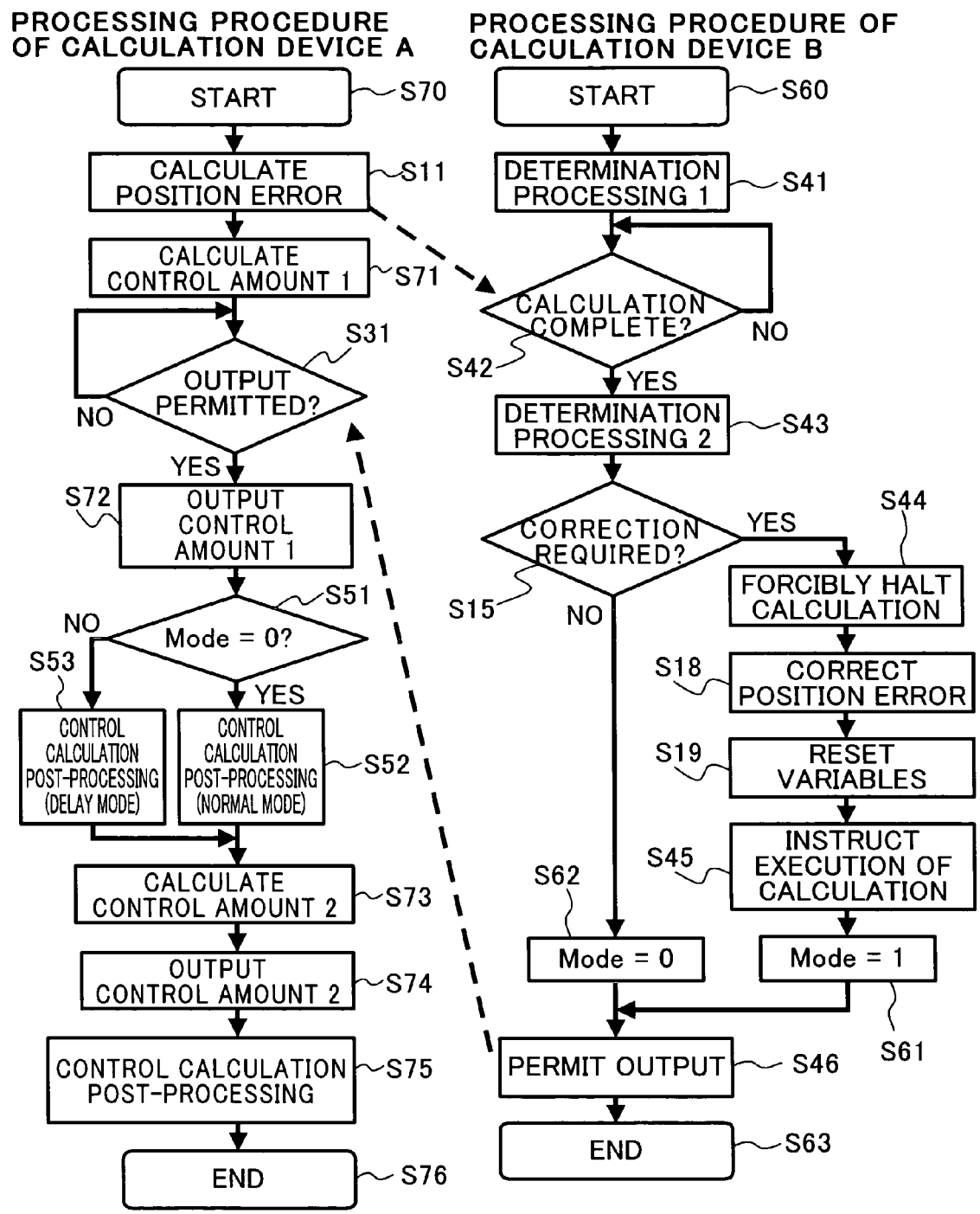
FIG. 15 shows an example of a flowchart showing a calculation processing operation executed by two calculation devices.

FIG. 15 shows an example of so-called double multi-rate control in which two control amounts are output during a single sample period. Identical reference symbols have been allocated to processes which are identical to those shown in FIG. 14 and so on.

The calculation device A performs calculation of an initial control amount (control amount 1 calculation, S71), and outputs this control amount (control amount 1 output, S72) upon reception of output permission from the calculation device B (YES in S31). Following control amount post-processing (S52, S53), the calculation device A calculates a second control amount (control amount 2 calculation, S73) and outputs this second control amount (control amount 2 output, S74).

If correction is required during calculation of the control amount 2 (YES in S15), the position error is corrected (S18) before outputting the control amount 1 (S72), and hence there is no need to repeat the determination and correction processing and so on, on the calculation device B side.

All other processes are substantially identical to the processes shown in FIG. 14 and so on.

By means of this processing, two control amounts can be output during one sample period, and the calculation delay time can be shortened similarly to the examples described above. Moreover, when resetting the variables, the variable values prior to the start of calculation are stored separately in the save memory so that resetting calculation can be performed using these values.

FIG. 16 shows an example of N (where N is an integer of 3 or more) multiple multi-rate control. In this case, N control amounts (current values in this example also) can be output during one sample period.

The calculation device A calculates a first (N=1) control amount (S71), waits for output permission from the calculation device B, and then outputs the control amount (YES in S31, S72). The value of N is then reduced by 1 (S81), whereupon the control amount N is calculated and output (S82). Following the control calculation post-processing (S83), the value of N is reduced by 1 (S84), and this process is repeated until N control amounts have been output (S85).

All other processes are substantially identical to the processes shown in FIG. 15 and so on.

By means of this processing, N control amounts can be output during one sample period, and the calculation delay time can be shortened similarly to the examples described above. Moreover, the variable values prior to the start of calculation are stored in the save area of the memory, and hence during processing of variable resetting (S19), the variables can be re-calculated using the variable values prior to the start of calculation.

In the above examples using the two calculation devices A, B, the dedicated calculation DSP 31 is used as the calculation device A and the universal MCU 30 is used as the calculation device B, as shown in FIG. 9. However, the MCU 30 may be used as the calculation device A and the HDC 24 may be used as the calculation device B. In this case, the HDC 24 serving as the calculation device B performs data input and output with the host as an IF processor, and during control calculation processing, the HDC 24 is caused to perform determination and correction processing (or determination and correction processing, and processing of variable resetting). Identical processing to that shown in FIG. 10A to 10F onward may be performed by the MCU 30 and HDC 24, and identical operations and effects are exhibited thereby.

In all of the examples described above, the magnetic disk device 1 is used as an example of a disk device. However, this embodiment may be applied to a disk device other than a magnetic disk device, for example an optical disk device for a disk such as a CD or DVD or a magneto-optical disk device for a disk such as an MO or MD, whereby similar operations and effects are exhibited.

This embodiment may also be applied to an information processing system having the disk device. Examples of the information processing system include a personal computer, a computer (or information recording and reproduction device) having a RAID (Redundant Array of Inexpensive Disks), a TV, a recording and reproducing device for recording and reproducing video and audio (such as a so-called HDD recorder), a portable information terminal (a PDA (Personal Digital Assistant), cellular phone, portable music reproducing device, and soon, for example), and so on. Similar operations and effects to those of the examples described above are obtained in these cases also.

What is claimed is:

1. A positioning control device for positioning a head of a disk device in a target position, comprising:

a control unit which calculates a control amount of a positioning control and outputs said control amount to a drive unit of said disk device for driving said head; and a storage unit which continues to hold a variable value, which is used to calculate said control amount prior to the start of said calculation of said control amount, following said calculation of said control amount, wherein said control unit re-executes calculation of said control amount using said variable value stored in said storage unit during said calculation of said control amount, following said calculation of said control amount, said control unit has a first calculation unit and second calculation unit, said first calculation unit executes said calculation of said control amount and said second calculation unit executes determination processing relating to a positioning control state, and said determination processing relating to the position control state determines whether or not said calculation of said control amount performed by said first calculation unit is correct, and when said second calculation unit determines that said calculation of said control amount performed by said first calculation unit is not correct, said second calculation unit corrects an input value of said calculation of said control amount inputted to said second calculation unit.

2. The positioning control device according to claim 1, wherein said control unit outputs said control amount to said drive unit immediately following said calculation of said control amount.

3. The positioning control device according to claim 2, wherein, when said second calculation unit determines that said calculation of said control amount performed by said first calculation unit is not correct, said second calculation unit interrupts said calculation of control amount of said first calculation unit, said first calculation unit or said second calculation unit corrects said input value of said calculation of said control amount and resets said variable value prior to the start of said calculation of said control amount, and said first calculation unit re-executes said calculation of said control amount using said corrected input value and said reset variable value.

4. The positioning control device according to claim 1, wherein said first calculation unit outputs said calculated control amount to said drive unit upon input of a control amount output permission from said second calculation unit following said calculation of said control amount.

5. The positioning control device according to claim 4, wherein, when said second calculation unit determines that said calculation of said control amount performed by said first calculation unit is not correct, said second calculation unit interrupts said calculation of said control amount of said first calculation unit, said first calculation unit or said second calculation unit corrects said input value of said calculation of said control amount and resets said variable value prior to the start of said calculation of said control amount, and said first calculation unit re-executes said calculation of said control amount using said corrected input value and said reset variable value.

6. The positioning control device according to claim 5, wherein, during re-execution of said calculation of said control amount, said first calculation unit executes said calculation of said control amount using a different state variable depending on an output timing of said control amount.

7. A disk device for positioning a head in a target position, comprising:
a drive unit which drives said head;
a control unit which calculates a control amount of a positioning control and outputting said control amount to said drive unit; and
a storage unit which continues to hold a variable value, which is used to calculate said control amount prior to the start of said calculation of said control amount, following said calculation of said control amount,
wherein said control unit re-executes calculation of said control amount using said variable value stored in said storage unit during said calculation of said control amount, following said calculation of said control amount,
said control unit has a first calculation unit and second calculation unit,
said first calculation unit executes said calculation of said control amount and said second calculation unit executes determination processing relating to a positioning control state, and
said determination processing relating to the position control state determines whether or not said calculation of said control amount performed by said first calculation unit is correct, and when said second calculation unit determines that said calculation of said control amount performed by said first calculation unit is not correct, said second calculation unit corrects an input value of said calculation of said control amount inputted to said second calculation unit.

8. The disk device according to claim 7, wherein said control unit outputs said control amount to said drive unit immediately following said calculation of said control amount.

9. The disk device according to claim 8, wherein, when said second calculation unit determines that said calculation of said control amount performed by said first calculation unit is not correct, said second calculation unit interrupts said calculation of said control amount of said first calculation unit, said first calculation unit or said second calculation unit corrects said input value of said calculation of said control amount and resets said variable value prior to the start of said calculation of said control amount, and said first calculation unit re-executes said calculation of said control amount using said corrected input value and said reset variable value.

10. The disk device according to claim 7, wherein said first calculation unit outputs said calculated control amount to said drive unit upon input of a control amount output permission from said second calculation unit following said calculation of said control amount.

11. The disk device according to claim 10, wherein, when said second calculation unit determines that said calculation of said control amount performed by said first calculation unit is not correct, said second calculation unit interrupts said calculation of said control amount of said first calculation unit, said first calculation unit or said second calculation unit corrects said input value of said calculation of said control amount and resets said variable value prior to the start of said calculation of said control amount, and said first calculation unit re-executes said calculation of said control amount using said corrected input value and said reset variable value.

12. The disk device according to claim 11, wherein, during re-execution of said calculation of said control amount, said first calculation unit executes said calculation of said control amount using a different state variable depending on an output timing of said control amount.

13. A positioning control method for positioning a head of a disk device in a target position, comprising the steps of:
continuing to hold in a storage unit a variable value, which is used to calculate a control amount prior to the start of calculation of said control amount, following said calculation of said control amount;
calculating the control amount of positioning control and re-executing calculation of said control amount using said variable value stored in said storage unit during said calculation of said control amount, following said calculation of said control amount; and
outputting said control amount calculated during said calculation of said control amount to a drive unit of said disk device for driving said head,
wherein said calculation step includes execution of determination processing relating to a positioning control state, and
said determination processing relating to the position control state determines whether or not said calculation of said control amount is correct, and when said second calculation unit determines that said calculation of said control amount performed is not correct, corrects an input value of said calculation of said control amount.

14. An information processing system having a disk device for positioning a head in a target position, said disk device comprising:
a drive unit which drives said head;

a control unit which calculates a control amount of positioning control and outputs said control amount to said drive unit; and a storage unit for continuing to hold a variable value, which is used to calculate said control amount prior to the start of said calculation of said control amount, following said calculation of said control amount, wherein said control unit re-executes calculation of said control amount using said variable value stored in said storage unit during said calculation of said control amount, following said calculation of said control amount, said control unit has a first calculation unit and second calculation unit, said first calculation unit executes said calculation of said control amount and said second calculation unit executes determination processing relating to a positioning control state, and said determination processing relating to the position control state determines whether or not said calculation of said control amount performed by said first calculation unit is correct, and when said second calculation unit determines that said calculation of said control amount performed by said first calculation unit is not correct, said second calculation unit corrects an input value of said calculation of said control amount inputted to said second calculation unit.

* * * * *